(12) United States Patent
Bohara

(10) Patent No.: US 12,114,039 B2
(45) Date of Patent: Oct. 8, 2024

(54) ELECTRONIC APPARATUS AND CONTROLLING METHOD THEREOF

(71) Applicant: SAMSUNG ELECTRONICS CO., LTD., Suwon-si (KR)

(72) Inventor: Manmohan Singh Bohara, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 21 days.

(21) Appl. No.: 17/437,281

(22) PCT Filed: Jul. 27, 2021

(86) PCT No.: PCT/KR2021/009736
§ 371 (c)(1),
(2) Date: Sep. 8, 2021

(87) PCT Pub. No.: WO2022/055127
PCT Pub. Date: Mar. 17, 2022

(65) Prior Publication Data
US 2022/0329901 A1 Oct. 13, 2022

(30) Foreign Application Priority Data
Sep. 8, 2020 (KR) .................. 10-2020-0114793

(51) Int. Cl.
*H04N 21/4415* (2011.01)
*G10L 17/06* (2013.01)
(Continued)

(52) U.S. Cl.
CPC ......... *H04N 21/4415* (2013.01); *G10L 17/06* (2013.01); *G10L 17/22* (2013.01);
(Continued)

(58) Field of Classification Search
CPC ....... H04N 21/44218; H04N 21/42203; H04N 21/4532; H04N 21/482; H04N 21/4415; H04N 21/4542
See application file for complete search history.

(56) References Cited

U.S. PATENT DOCUMENTS 9,998,790 B1 * 6/2018 Logan ................ H04N 21/4668
10,178,432 B2 1/2019 Richman
(Continued)

FOREIGN PATENT DOCUMENTS

JP 2019-028915 A 2/2019
JP 6861398 4/2021
(Continued)

OTHER PUBLICATIONS

International Search Report for International Patent Application No. PCT/KR2021/009736 dated Nov. 12, 2021.
(Continued)

*Primary Examiner* — Jason Salce
(74) *Attorney, Agent, or Firm* — STAAS & HALSEY LLP

(57) ABSTRACT

An electronic apparatus is provided. The electronic apparatus includes: a display; and a processor configured to: control the display to display a content based on one mode of a plurality of display modes, receive a user voice in real time while the content is being displayed, identify user's age information corresponding to the received user voice, identify whether or not the one mode is a kids mode when the identified user's age information is less than a threshold value, and change the one mode to the kids mode when it is identified that the one mode is not the kids mode.

13 Claims, 21 Drawing Sheets

(51) Int. Cl.
  *G10L 17/22* (2013.01)
  *H04N 21/422* (2011.01)
  *H04N 21/45* (2011.01)
  *H04N 21/472* (2011.01)

(52) U.S. Cl.
  CPC ... *H04N 21/42203* (2013.01); *H04N 21/4532* (2013.01); *H04N 21/47202* (2013.01)

(56) References Cited

U.S. PATENT DOCUMENTS

| | | | |
|---|---|---|---|
| 10,887,654 B2 | 1/2021 | Kim et al. | |
| 2006/0075429 A1 | 4/2006 | Istvan et al. | |
| 2008/0066124 A1* | 3/2008 | Igoe | H04N 21/4782 725/135 |
| 2008/0294439 A1 | 11/2008 | Kirby | |
| 2011/0060592 A1 | 3/2011 | Kang et al. | |
| 2014/0223461 A1* | 8/2014 | Hatambeiki | H04N 21/4415 725/10 |
| 2016/0057497 A1 | 2/2016 | Kim et al. | |
| 2016/0112760 A1* | 4/2016 | Kosseifi | H04N 21/44008 725/28 |
| 2016/0323643 A1 | 11/2016 | Panchaksharaiah et al. | |
| 2018/0352302 A1 | 12/2018 | Roe et al. | |
| 2021/0105535 A1 | 4/2021 | Kim et al. | |
| 2022/0124416 A1* | 4/2022 | Topalli | H04N 21/4852 |

FOREIGN PATENT DOCUMENTS

| | | |
|---|---|---|
| KR | 10-2004-0060521 A | 7/2004 |
| KR | 10-2011-0027362 A | 3/2011 |
| KR | 10-1189765 | 10/2012 |
| KR | 10-1289081 B1 | 7/2013 |
| KR | 10-2016-0132809 A | 11/2016 |
| KR | 10-2018-0012192 | 2/2018 |
| KR | 10-1936639 B1 | 1/2019 |
| KR | 10-2021-0158553 | 12/2021 |

OTHER PUBLICATIONS

Written Opinion for International Patent Application No. PCT/KR2021/009736 dated Nov. 12, 2021.
Supplementary Extended European Search Report dated Jul. 20, 2023 in European Patent Application No. 21866994.3.
Office Action dated Jul. 8, 2024 for corresponding European application No. 21 866 994.3.

* cited by examiner

ELECTRONIC APPARATUS AND CONTROLLING METHOD THEREOF

CROSS-REFERENCE TO RELATED APPLICATIONS

This application is a U.S. National Stage Application, which claims the benefit under 35 U.S.C. § 371 of PCT International Patent Application No. PCT/KR2021/009736, filed Jul. 27, 2021 which claims the foreign priority benefit under 35 U.S.C. § 119 of Korean Patent Application No. 10-2020-0114793, filed on Sep. 8, 2020, in the Korean Intellectual Property Office, the contents of which are incorporated herein by reference.

BACKGROUND

Field

Apparatuses and methods consistent with the disclosure relate to an electronic apparatus and a controlling method thereof, and more particularly, to an electronic apparatus that automatically sets a kids mode related to a content, and a controlling method thereof.

Description of the Related Art

Currently, a smart television (TV) or a set-top box (STB) provides a kids mode to protect children from an adult content. The kids mode may be called a child mode, a parental control mode, and a parental lock mode.

The kids mode may be a mode in which an adult content that is not a child content is not provided. For example, in the kids mode, a content having brutal violence or a content having sensationalism may not be provided. When a content is a video on demand (VOD), the VOD itself may not be displayed, and when a content corresponds to a channel, the channel may not be displayed.

However, there was an inconvenience that a user directly performs a manipulation or performs log-in with a separate account to set the kids mode.

SUMMARY

According to an embodiment of the disclosure, an electronic apparatus includes: a display; and a processor configured to: control the display to display a content based on one mode of a plurality of display modes, receive a user voice in real time while the content is being displayed, identify user's age information corresponding to the received user voice, identify whether the one mode is a kids mode based on the identified user's age information being less than a threshold value, and change the one mode to the kids mode based on the one mode being not the kids mode.

The kids mode is a mode of selectively providing only a content corresponding to the identified user's age information and the process is configured to provide at least one of a kids channel content or a kids video on demand (VOD) content corresponding to the identified user's age information based on the identified user's age information being less than the threshold value.

The processor is configured to display a guide screen to guide entry into the kids mod.

The processor is configured to transmit a control command to run the kids mode to a plurality of apparatuses connected to an Internet of Things (IoT) network including the electronic apparatus based on the identified user's age information is less than the threshold value.

The processor is configured to identify a watching rating age corresponding to the content displayed on the display and controls the display to display a content corresponding to the identified user age based on the identified user age being less than the identified watching rating age.

The processor is configured to perform control to run the kids mode through at least one application installed in the electronic apparatus based on the identified user's age information being less than the threshold value.

The received user voice is voice of a first user. In addition, the processor is configured to run the kids mode to display a content corresponding to identified first user's age information based on the identified first user's age information being less than the threshold value, identify second user's age information corresponding to a second user voice which is of a second user to cancel the run kids mode based on the second user voice being received, cancel the run kids mode based on the second user's age information being equal to or greater than the threshold value and maintain the run kids mode based on the second user's age information being less than the threshold value.

The processor is configured to adjust a volume of the electronic apparatus to a volume corresponding to the identified user's age information or adjust a brightness of the display to a brightness corresponding to the identified user's age information, based on the identified user's age information being less than the threshold value.

The received user voice includes a plurality of user voices and the processor is configured to identify user's age information corresponding to each of the plurality of user voices and run the kids mode based on a minimum age of the identified age information corresponding to each of the plurality of user voices being less than the threshold value.

The electronic apparatus further comprises a memory configured to store a voice recognition module, the processor is configured to identify a watching rating age corresponding to the content displayed on the display and run the voice recognition module to receive the user voice based on the identified watching rating age being equal to or greater than the threshold value.

According to another embodiment of the disclosure, a controlling method of an electronic apparatus includes: displaying a content based on one mode of a plurality of display modes; receiving a user voice in real time while the content is being displayed; identifying user's age information corresponding to the received user voice; identifying whether the one mode is a kids mode based on the identified user's age information being less than a threshold value; and changing the one mode to the kids mode based on it is identified that the one mode being not the kids mode.

The kids mode is a mode of selectively providing only a content corresponding to the identified user's age information and the controlling method of an electronic apparatus further comprises providing at least one of a kids channel content or a kids VOD content corresponding to the identified user's age information based on the identified user's age information being less than the threshold value.

The controlling method of an electronic apparatus further comprising displaying a guide screen guiding entry into the kids mode.

The controlling method of an electronic apparatus further comprising transmitting a control command for running the kids mode to a plurality of apparatuses connected to an IoT network including the electronic apparatus based on the identified user's age information being less than the threshold value.

The changing of the one mode to the kids mode comprises identifying a watching rating age corresponding to the content displayed on the display of the electronic apparatus and displaying a content corresponding to the identified user age based on the identified user age being less than the identified watching rating age.

BRIEF DESCRIPTION OF DRAWINGS

The above and/or other aspects of the disclosure will be more apparent by describing certain embodiments of the disclosure with reference to the accompanying drawings, in which.

DETAILED DESCRIPTION

Figure 1:
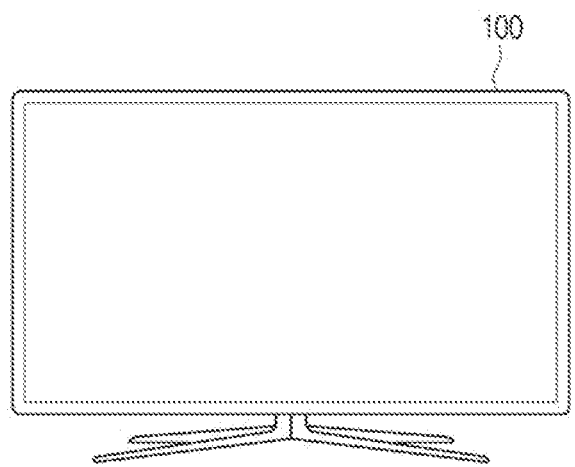
FIG. 1 is a view for describing an embodiment of receiving a user voice.
Figure 1:
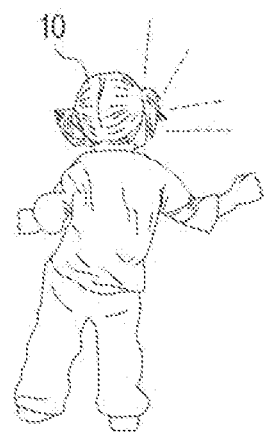

Hereinafter, the disclosure will be described in detail with reference to the accompanying drawings.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in embodiments of the disclosure are to be defined on the basis of the meaning of the terms and the contents throughout the disclosure rather than simple names of the terms.

In the specification, an expression "have", "may have", "include", "may include", or the like, indicates existence of a corresponding feature (for example, a numerical value, a function, an operation, a component such as a part, or the like), and does not exclude existence of an additional feature.

An expression "at least one of A and/or B" is to be understood to represent "A" or "B" or "A and B".

Expressions "first", "second", or the like, used in the specification may indicate various components regardless of a sequence and/or importance of the components, will be used only to distinguish one component from the other components, and do not limit the corresponding components.

When it is mentioned that any component (for example, a first component) is (operatively or communicatively) coupled with/to or is connected to another component (for example, a second component), it is to be understood that any component is directly coupled to another component or may be coupled to another component through the other component (for example, a third component).

Singular forms are intended to include plural forms unless the context clearly indicates otherwise. It should be understood that terms "include" or "formed of" used in the specification specify the presence of features, numerals, steps, operations, components, parts, or combinations thereof mentioned in the specification, but do not preclude the presence or addition of one or more other features, numerals, steps, operations, components, parts, or combinations thereof.

In the disclosure, a "module" or a "~er/or" may perform at least one function or operation, and be implemented as hardware or software or be implemented as a combination of hardware and software. In addition, a plurality of "modules" or a plurality of "~ers/~ors" may be integrated in at least one module and be implemented as at least one processor (not illustrated) except for a "module" or a "~er/or" that needs to be implemented as specific hardware.

In the disclosure, a term "user" may refer to a person using an electronic apparatus or an apparatus (for example, an artificial intelligence electronic apparatus) using an electronic apparatus.

Hereinafter, an embodiment of the disclosure will be described in detail with reference to the accompanying drawings.

FIG. 1 is a view for describing an embodiment of receiving a user voice.

Referring to FIG. 1, the electronic apparatus 100 may receive a voice of a user 10.

According to an embodiment, the electronic apparatus 100 may include a microphone (not illustrated), and may directly receive a user voice through the microphone included in the electronic apparatus 100. In addition, the electronic apparatus 100 may identify user's age information (or a value associated with the identified user's age information or user's age value) corresponding to the received user voice.

According to another embodiment, the electronic apparatus 100 may receive a voice of the user 10 from a remote control apparatus (not illustrated). Specifically, the remote control apparatus may include a microphone (not illustrated), and may directly receive a user voice through the microphone included in the remote control apparatus. In addition, the remote control apparatus may transmit the received user voice to the electronic apparatus 100. In addition, the electronic apparatus 100 may identify user's age information corresponding to the received user voice.

Figure 2:
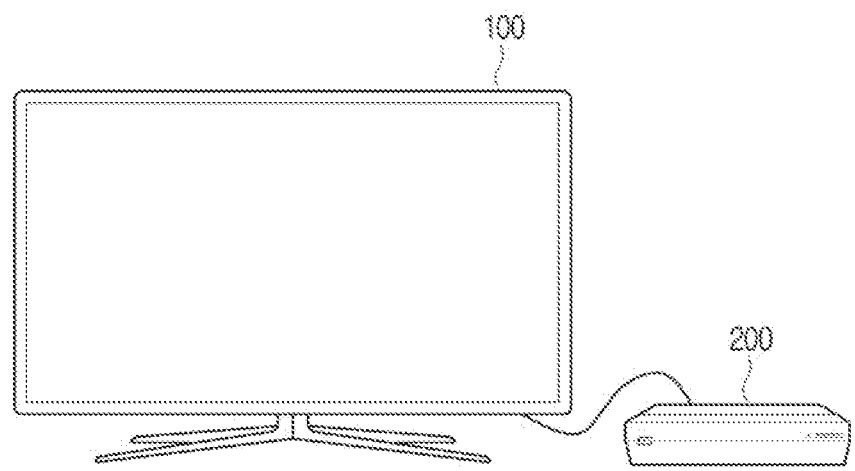
FIG. 2 is a view for describing another embodiment of receiving a user voice.
Figure 2:
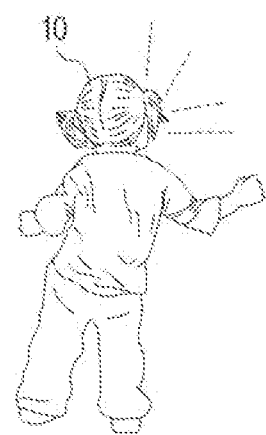

FIG. 2 is a view for describing another embodiment of receiving a user voice.

Referring to FIG. 2, an external apparatus 200 providing a content to the electronic apparatus 100 may receive a voice of the user 10. Here, the external apparatus 200 may be a set-top box transmitting a content to the electronic apparatus 100. In addition, the external apparatus 200 may include a microphone (not illustrated). In addition, the external apparatus 200 may directly receive a user voice through the microphone included in the external apparatus 200.

According to an embodiment, the external apparatus 200 may identify user's age information by directly analyzing the user voice.

According to another embodiment, the external apparatus 200 may transmit the user voice to the electronic apparatus 100, and the electronic apparatus 100 may identify the user's age information corresponding to the user voice.

Figure 3:
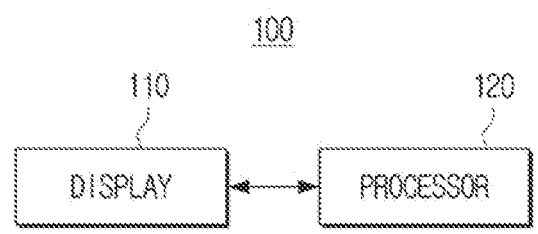
FIG. 3 is a block diagram illustrating an electronic apparatus according to an embodiment of the disclosure.

FIG. 3 is a block diagram illustrating an electronic apparatus according to an embodiment of the disclosure.

Referring to FIG. 3, the electronic apparatus 100 may include a display 110 and a processor 120.

Electronic apparatuses according to diverse embodiments of the specification may include at least one of, for example, a smartphone, a tablet personal computer (PC), a mobile phone, a video phone, an e-book reader, a desktop PC, a laptop PC, a netbook computer, a workstation, a server, a personal digital assistants (PDA), a portable multimedia player (PMP), an MP3 player, a medical device, a camera, or a wearable device. The wearable device may include at least one of an accessory type wearable device (for example, a watch, a ring, a bracelet, an anklet, a necklace, a glasses, a contact lens, or a head-mounted-device (HMD), a textile or clothing integral type wearable device (for example, an electronic clothing), a body attachment type wearable device (for example, a skin pad or a tattoo), or a living body implantation type wearable device. In some embodiments, the electronic apparatus may include at least one of, for example, a television (TV), a digital video disk (DVD) player, an audio player, a refrigerator, an air conditioner, a cleaner, an oven, a microwave oven, a washing machine, an air cleaner, a set-top box, a home automation control panel, a security control panel, a media box (for example, Home-Sync™ of Samsung Electronics Co., Ltd, TV™ of Apple Inc, or TV™ of Google), a game console (for example Xbox™, PlayStation™), an electronic dictionary, an electronic key, a camcorder, or a digital photo frame.

The display 110 may be implemented as various types of displays such as a liquid crystal display (LCD), an organic light emitting diode (OLED) display, a plasma display panel (PDP), and the like. A driving circuit, a backlight unit, and the like, that may be implemented in the form such as an a-si thin film transistor (TFT), a low temperature poly silicon (LTPS), a TFT, an organic TFT (OTFT), and the like, may be included in the display 110. Meanwhile, the display 110 may be implemented as a touch screen combined with a touch sensor, a flexible display, a three-dimensional (3D) display, or the like.

In addition, the display 110 according to an embodiment of the disclosure may include not only a display panel outputting an image, but also a bezel housing the display panel. In particular, the bezel according to an embodiment of the disclosure may include a touch sensor (not illustrated) for sensing a user interaction.

The processor 120 may perform a general control operation of the electronic apparatus 100. Specifically, the processor 120 serves to control a general operation of the electronic apparatus 100.

The processor 120 may be implemented as a digital signal processor (DSP), a microprocessor, or a time controller (TCON) processing a digital signal. However, the processor 120 is not limited thereto, and may include one or more of a central processing unit (CPU), a micro controller unit (MCU), a micro processing unit (MPU), a controller, an application processor (AP), a graphics processing unit (GPU) or a communication processor (CP), or an ARM processor, or may be defined by these terms. In addition, the processor 120 may be implemented as a system-on-chip (SoC) or a large scale integration (LSI) in which a processing algorithm is embedded or may be implemented in a field programmable gate array (FPGA) form. In addition, the processor 120 may perform various functions by executing computer executable instructions stored in a memory.

The processor 120 may include a processor controlling the display 110 to display a content based on one mode of a plurality of display modes, receiving a user voice in real time while the content is being displayed, identifying user's age information corresponding to the received user voice, identifying whether or not the one mode is a kids mode when the identified user's age information (or user's age or user's age value) is less than a threshold value, and changing the one mode to the kids mode when it is identified that the one mode is not the kids mode.

Here, the plurality of display modes may refer to modes in which the electronic apparatus 100 operates differently according to a setting of the electronic apparatus 100. The plurality of display modes may include a normal mode and a kids mode, and may additionally include a power saving mode, a mute mode, and the like. The normal mode may refer to a mode in which the user may use the electronic apparatus 100 without any restriction.

The processor 120 may display a content based on one mode of the plurality of display modes. Here, the displayed content may be an adult content. When a child approaches the electronic apparatus 100 while the adult content is being displayed, it may be inappropriate that the adult content is displayed. Therefore, the processor 120 may determine in real time whether or not the child approaches the electronic apparatus 100.

Specifically, the processor 120 may receive the user voice in real time while the content is being displayed. According to an embodiment, the processor 120 may receive the user voice in real time while all contents are being displayed. According to another embodiment, the processor 120 may receive the user voice in real time only while the adult content is being displayed. However, because a situation in which contents are divided into a general content and an adult content is simply assumed in the abovementioned embodiment, the processor 120 may not receive the user voice in real time while a content that may be watched by all age groups is being displayed, and may receive the user voice in real time when a content that may be watched by a specific age group is displayed.

Here, the electronic apparatus 100 may directly include a microphone 170 to receive the user voice, and the processor 120 may obtain the user voice through the microphone 170. According to another implementation example, the processor 120 may receive audio data corresponding to the user voice from an external apparatus (not illustrated). Here, the external apparatus (not illustrated) may be a remote control apparatus (for controlling the electronic apparatus 100) including a microphone.

Meanwhile, here, the processor 120 may identify age information corresponding to the received user voice. When the identified age information is less than a threshold value (for example, 7), the processor 120 may identify whether or not a current mode of the electronic apparatus 100 is the kids mode. When the current mode of the electronic apparatus 100 is the kids mode, the processor 120 may not perform a separate operation. This is because a content provided in the kids mode is restrictive. However, when the current mode of the electronic apparatus 100 is not the kids mode, the processor 120 may control the electronic apparatus 100 to change the current mode of the electronic apparatus 100 to the kids mode. Meanwhile, when the current mode of the electronic apparatus 100 is changed to the kids mode, the processor 120 may control the electronic apparatus 100 to no longer receive the user voice in real time. This is to save power by turning off the microphone 170 receiving the user voice.

Meanwhile, the kids mode is a mode of selectively providing only a content corresponding to the identified user's age information, and the processor may provide at least one of a kids channel content or a kids video on demand (VOD) content corresponding to the identified user's age information when the identified user's age information is less than the threshold value.

Here, the kids channel content may refer to a content provided by a kids channel. In addition, the kids channel content or the kids VOD content may be received through the external apparatus 200. In addition, the processor 120 may not display the adult content on the display 110 while the kids mode is running.

According to an embodiment, when the kids mode runs, the processor 120 may display a predetermined content instead of the adult content. The predetermined content will be described later with reference to FIGS. 11 and 12.

As an example, the content corresponding to the identified user's age information may refer to a predetermined content appropriate for the age information. For example, when the user is 7 years old, a cartoon content corresponding to 7 years old may be provided. In addition, when the user is 15 years old, a movie content corresponding to 15 years old may be provided.

As another example, the content corresponding to the identified user's age information may refer to a content indicating that the kids mode is being performed.

According to another embodiment, when the kids mode runs, the processor 120 may change a setting of hardware included in the electronic apparatus 100. This will be described later with reference to FIG. 8.

As described above with reference to FIGS. 1 and 2, there may be a plurality of embodiments of receiving the user voice. As an example, the user voice may be received using the microphone 170 included in the electronic apparatus 100. As another example, the user voice may be received using the microphone (not illustrated) included in the remote control apparatus (not illustrated) corresponding to the electronic apparatus 100. As still another example, the user voice may be received using the microphone (not illustrated) included in the external apparatus 200.

After receiving the user voice, the processor 120 may identify the user's age information (user age information) by analyzing the user voice. To identify the user age information, the processor 120 may perform voice recognition.

According to an embodiment, the electronic apparatus 100 may directly include a voice recognition model, and the processor 120 may directly obtain (or identify) the user age information without transferring the user voice to an external server.

According to another embodiment, the external server may include a voice recognition model, and the processor 120 may transmit the user voice to the external server. In addition, the processor 120 may receive the user age information from the external server.

The processor 120 may determine a display mode of the electronic apparatus 100 based on the obtained user age information. Specifically, when the user age is less than the threshold value, the processor 120 may run the kids mode. Here, the threshold value may be a predetermined value and may be changed according to a setting of the user. For example, an adult user may set the threshold value to be one of 7, 12, 15, or 19 years old.

Here, an operation of controlling the electronic apparatus 100 to operate in the kids mode may refer to changing the current mode of the electronic apparatus 100 to the kids mode.

Meanwhile, the processor 120 may determine whether or not to run the kids mode based on the user voice obtained for a threshold time. For example, the threshold time may be 30 minutes. When a child voice is not received for 30 minutes, the kids mode may be automatically canceled. 30 minutes is only an example and may be changed according to a setting of the user. However, even though the kids mode is canceled after 30 minutes have elapsed, when the child voice is received again, the processor 120 may set the kids mode again.

Meanwhile, the processor may control the display 110 to display a guide screen guiding entry into the kids mode (or guiding executing the kids mode).

The guide screen will be described later in detail with reference to FIG. 12. The processor 120 may control the display 110 to display a guide screen 1210 indicating that the kids mode is currently being performed.

Meanwhile, when the identified user's age information is less than the threshold value, the processor may transmit a control command for running the kids mode to a plurality of apparatuses connected to an Internet of Things (IoT) network including the electronic apparatus 100.

The processor 120 may generate a control command so that not only the electronic apparatus 100 runs the kids mode, but also other home appliances may perform the kids mode. This will be described later in detail with reference to FIG. 13.

Meanwhile, the processor may identify a watching rating age corresponding to the content displayed on the display 110, and control the display 110 to display a content corresponding to the identified user age when the identified user age is less than the identified watching rating age.

Here, the watching rating age may refer to an age corresponding to a watching rating predetermined for each content. The watching rating may be determined by a national institution or a content producer. In addition, the watching rating may be determined based on a subject, sensationalism, violence, dialogue, fear, drug, risk of imitation, and the like. The watching rating may be different depending on a content, and an age corresponding to a corresponding watching rating may be determined. For example, a content available to all age groups, a content available only to 7 years old or older, a content available only to 12 years old or older, a content available only to 15 years old or older, and a content available only to 19 years old or older may exist. Because a specific rating criterion may be different for each country or each region, a threshold value comparison operation according to various embodiments of the disclosure may be changed according to a country or a region.

According to an embodiment, the processor 120 may receive the watching rating age corresponding to the content through the external apparatus 200. Here, the external apparatus 200 refers to a set-top box, and thus, the processor 120 may resultantly obtain the watching rating age corresponding to the content through electronic program guide (EPG) data or the like.

According to another embodiment, the processor 120 may identify the watching rating age using an image included in the received content. For example, when the watching rating age is displayed in the content, the processor 120 may recognize the corresponding image to obtain the watching rating age corresponding to the content. For example, the processor 120 may use a technology such as optical character reader (recognition) (OCR) or automatic content recognition (ACR).

Meanwhile, the processor may perform control to run the kids mode through at least one application installed in the electronic apparatus 100 when the identified user's age information is less than the threshold value.

The processor 120 may generate and transmit a control command for running the kids mode with respect to an application including the kids mode among a plurality of applications installed in the electronic apparatus 100. The application will be described later in detail with reference to FIG. 17.

Meanwhile, the processor may run the kids mode to display a content corresponding to identified first user's age information when the identified first user's age information is less than the threshold value, identify second user's age information corresponding to a second user voice for canceling the run kids mode when the second user voice is received, cancel the run kids mode when the second user's age information is the threshold value or more, and maintain the run kids mode when the second user's age information is less than the threshold value.

The processor 120 may request a voice of an adult user to cancel the kids mode. Specifically, the processor 120 may set the kids mode so that the kids mode is not canceled by a physical button input or a general voice input, and may cancel the kids mode only when a user voice identified as an age of the threshold value or more is received. An operation of canceling the kids mode will be described later in detail with reference to FIG. 19.

Meanwhile, the processor may adjust a volume of the electronic apparatus 100 to a volume corresponding to the identified user's age information or adjust a brightness of the display 110 to a brightness corresponding to the identified user's age information, when the identified user's age information is less than the threshold value.

The processor 120 may change a setting of a speaker 180 or the display 110 of the processor 120 when the kids mode runs. Specifically, the processor 120 may change a volume of the speaker 180 or change the brightness of the display 110 in the kids mode. A memory 130 may store a table including an appropriate volume and brightness corresponding to the user age. In addition, the processor 120 may obtain a volume and a brightness corresponding to the identified user age, and may change a setting based on the obtained volume and brightness. Here, the processor 120 may display the changed volume and brightness on the display 110 as a user interface (UI). This will be described later in detail with reference to FIG. 8.

Meanwhile, the received user voice may include a plurality of user voices, and the processor may identify user's age information corresponding to each of the plurality of user voices and run the kids mode when a minimum age of the identified age information corresponding to each of the plurality of user voices is less than the threshold value.

The processor 120 may identify the number of users by analyzing the received user voices. For example, the processor 120 may receive voice data for a threshold time, and identify the number of users from the received voice data. In addition, the processor 120 may identify a user age corresponding to each of the identified number of users. In addition, the processor 120 may obtain a minimum age of a plurality of identified user ages, and determine whether or not to run the kids mode based on the obtained minimum age. The reason for considering the minimum age is that none of a plurality of users should be against the watching rating. This will be described later in detail with reference to FIG. 7.

Meanwhile, the electronic apparatus 100 may further include a memory for storing a voice recognition module, and the processor may identify the watching rating age corresponding to the content displayed on the display 110 and run the voice recognition module to receive the user voice when the identified watching rating age is a threshold value or more.

The processor 120 may be maintained in a state in which it may always receive the user voice while the content is being displayed on the display 110. Specifically, the processor 120 may be maintained in a state in which it receives the user voice by running the voice recognition module while the content is being displayed on the display 110. The voice recognition module may refer to a module used to obtain voice data using the microphone.

However, when the voice recognition module is run to always receive the user voice, a problem that power consumption increases may occur. Here, the processor 120 may run the voice recognition module only when a specific event occurs.

Specifically, the processor 120 may determine whether or not to run the voice recognition module in consideration of the watching rating age corresponding to the content. Because there is no need to run the kids mode for a content available to all age groups, the processor 120 may differently control whether or not to run the voice recognition module according to the content.

The processor 120 may identify a watching rating of the content to be displayed (or displayed) on the display 110, and obtain a watching rating age corresponding to the identified watching rating In addition, when the watching rating age is a threshold value or more, the processor 120 may change the voice recognition module that was in a turn-off state to a turn-on state. In addition, the voice recognition module may receive the user voice after being changed to the turn-on state.

Meanwhile, the threshold value related to the voice recognition module may be automatically determined based on the user's age information. Specifically, the processor 120 may determine the threshold value in consideration of all user age information received (or obtained) for a threshold time. For example, when the threshold time is one week, the processor 120 may determine the threshold value in consideration of all user age information obtained during one week. As an example, the processor 120 may determine the lowest age of the user age information obtained during the threshold time as the threshold value. This will be described later in detail with reference to FIG. 20.

Meanwhile, the electronic apparatus 100 according to an embodiment of the disclosure may automatically change its mode to the kids mode by a child voice even though the user does not directly manipulate the processor 120. Therefore, convenience of the user may be increased.

Meanwhile, the electronic apparatus 100 according to an embodiment of the disclosure may automatically cancel the kids mode when a threshold time elapses. Therefore, the user may watch an adult content in a state in which the kids mode is canceled without a separate manipulation. However, even in this case, when the child voice is received, the electronic apparatus 100 may automatically run the kids mode again.

Meanwhile, the electronic apparatus 100 according to an embodiment of the disclosure may automatically change the volume of the speaker 180 and the brightness of the display 110 in addition to a limitation of the content to provide an environment appropriate for the child even when the child watches the content alone.

The electronic apparatus 100 according to an embodiment of the disclosure may run the voice recognition module based on the watching rating age corresponding to the content. Therefore, the voice recognition module is used only under a specific condition, and power consumption may thus be saved.

Meanwhile, only simple components constituting the electronic apparatus 100 have been illustrated and described hereinabove, but various components may be further included in the electronic apparatus 100 at the time of implementing the electronic apparatus 100. These components will be described below with reference to FIG. 4.

Figure 4:
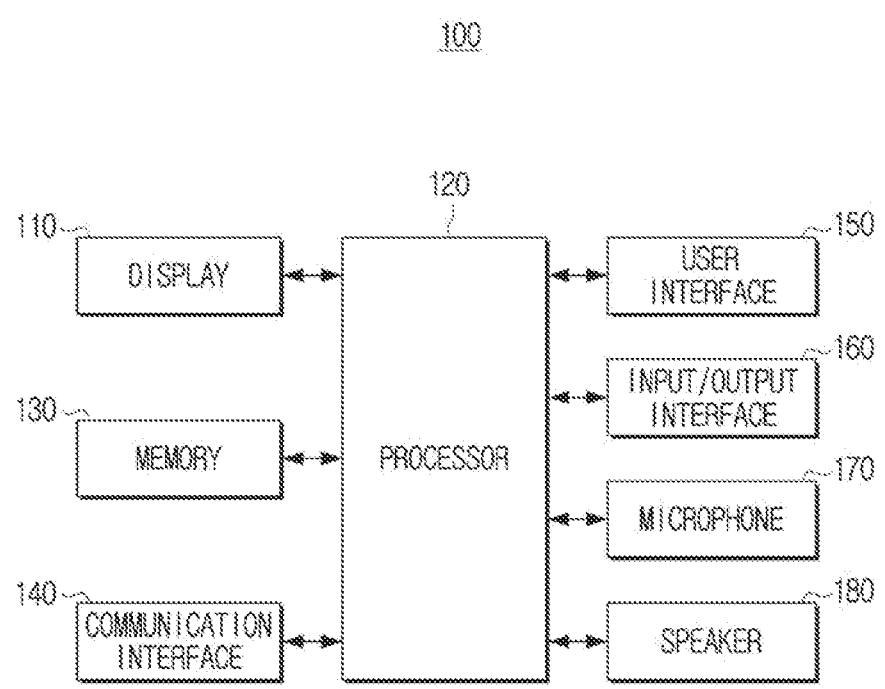
FIG. 4 is a block diagram for describing detailed components of FIG. 3.

FIG. 4 is a block diagram for describing detailed components of FIG. 3.

Referring to FIG. 4, the electronic apparatus 100 may include a display 110, a processor 120, a memory 130, a communication interface 140, a user interface 150, an input/output interface 160, a microphone 170, and a speaker 180.

Meanwhile, overlapping descriptions for the same operations as those described above among operations of the display 110 and the processor 120 will be omitted.

The memory 130 may be implemented as an internal memory such as a read-only memory (ROM) (for example, an electrically erasable programmable read-only memory (EEPROM)), a random access memory (RAM), or the like, included in the processor 120 or be implemented as a memory separate from the processor 120. In this case, the memory 130 may be implemented in the form of a memory embedded in the electronic apparatus 100 or the form of a memory attachable to and detachable from the electronic apparatus 100, depending on a data storing purpose. For example, data for driving the electronic apparatus 100 may be stored in the memory embedded in the electronic apparatus 100, and data for an extension function of the electronic apparatus 100 may be stored in the memory attachable to and detachable from the electronic apparatus 100.

Meanwhile, the memory embedded in the electronic apparatus 100 may be implemented as at least one of a volatile memory (for example, a dynamic RAM (DRAM), a static RAM (SRAM), a synchronous dynamic RAM (SDRAM), or the like) or a non-volatile memory (for example, a one time programmable ROM (OTPROM), a programmable ROM (PROM), an erasable and programmable ROM (EPROM), an electrically erasable and programmable ROM (EEPROM), a mask ROM, a flash ROM, a flash memory (for example, a NAND flash, a NOR flash or the like), a hard drive, or a solid state drive (SSD)), and the memory attachable to and detachable from the electronic apparatus 100 may be implemented in the form such as a memory card (for example, a compact flash (CF), a secure digital (SD), a micro-SD, a mini-SD, an extreme digital (xD), a multimedia card (MMC), or the like), an external memory (for example, a universal serial bus (USB) memory) connectable to a USB port, or the like.

The communication interface 140 is a component performing communication with various types of external apparatuses according to various types of communication manners. The communication interface 140 includes a wireless fidelity (WiFi) module, a Bluetooth module, an infrared communication module, a wireless communication module, and the like. Here, each communication module may be implemented in the form of at least one hardware chip.

The Wi-Fi module and the Bluetooth module perform communication in a Wi-Fi manner and a Bluetooth manner, respectively. When the Wi-Fi module or the Bluetooth module is used, various connection information such as a service set identifier (SSID), a session key, and the like, is first transmitted and received, communication is connected using the connection information, and various information may then be transmitted and received.

The infrared communication module performs communication according to an infrared data association (IrDA) technology of wirelessly transmitting data to a short distance using an infrared ray positioned between a visible ray and a millimeter wave.

The wireless communication module may include at least one communication chip performing communication according to various wireless communication standards such as zigbee, $3^{rd}$ generation (3G), $3^{rd}$ generation partnership project (3GPP), long term evolution (LTE), LTE advanced (LTE-A), $4^{th}$ generation (4G), $5^{th}$ generation (5G), and the like, in addition to the communication manner described above.

In addition, the communication interface 140 may include at least one of a local area network (LAN) module, an Ethernet module, or wired communication modules performing communication using a pair cable, a coaxial cable, an optical fiber cable, an ultra wide-band module, or the like.

According to an example, the communication interface 140 may use the same communication module (for example, the WiFi module) to communicate with an external apparatus such as a remote control and an external server.

According to an example, the communication interface 140 may use different communication modules (for example, WiFi modules) to communicate with an external apparatus such as a remote control and an external server. For example, the communication interface 140 may use at least one of the Ethernet module or the WiFi module to communicate with the external server, and may use a BT module to communicate with the external apparatus such as the remote control. However, this is only an example, and the communication interface 140 may use at least one of various communication modules when it communicates with a plurality of external apparatuses or external servers.

The user interface 150 may be implemented as a device such as a button, a touch pad, a mouse, and a keyboard or may be implemented as a touch screen that may perform both of the abovementioned display function and manipulation input function. Here, the button may be various types of buttons such as a mechanical button, a touch pad, a wheel, and the like, formed in any region such as a front surface portion, a side surface portion, a back surface portion, and the like, of a body appearance of the electronic apparatus 100.

The input/output interface 160 may be any one of a high definition multimedia interface (HDMI), a mobile high-definition link (MHL), a universal serial bus (USB), a display port (DP), a thunderbolt, a video graphics array (VGA) port, an RGB port, a D-subminiature (D-SUB), or a digital visual interface (DVI).

The input/output interface 160 may input/output at least one of an audio signal or a video signal.

According to an implementation, the input/output interface 160 may include a port inputting/outputting only an audio signal and a port inputting/outputting only a video signal as separate ports, or may be implemented as a single port inputting/outputting both of an audio signal and a video signal.

The microphone 170 may receive the user voice in an activated state. For example, the microphone 170 may be formed integrally with an upper side, a front surface, a side surface, or the like, of the electronic apparatus 100. The microphone 170 may include various components such as a microphone collecting a user voice having an analog form, an amplifying circuit amplifying the collected user voice, an A/D converting circuit sampling the amplified user voice to convert the amplified user voice into a digital signal, a filter circuit removing a noise component from the converted digital signal, and the like.

The speaker 180 is a component outputting various notification sounds, a voice message, or the like, as well as various audio data processed by the input/output interface.

Figure 5:
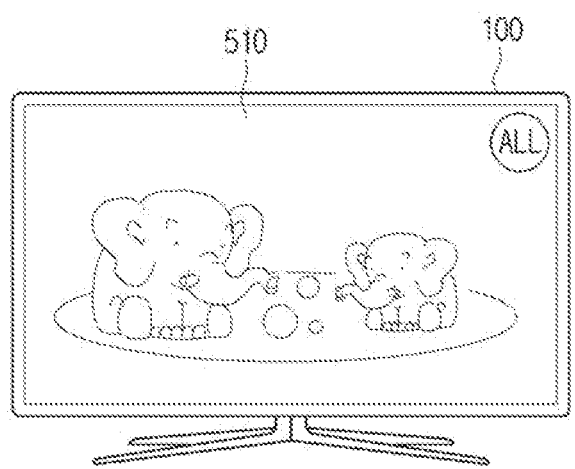
FIG. 5 is a view for describing an operation of an electronic apparatus according to an embodiment when a child voice is identified while a general content is being displayed.
Figure 5:
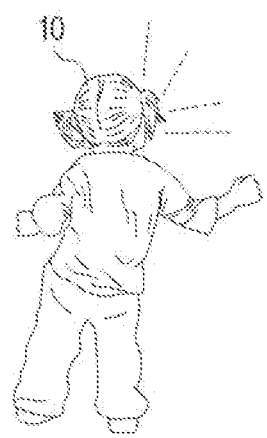

FIG. 5 is a view for describing an operation of an electronic apparatus according to an embodiment when a child voice is identified while a general content is being displayed.

Referring to FIG. 5, the electronic apparatus 100 may provide a general content 510 to the user through the display 110. Here, the general content 510 may refer to a content corresponding to "available to all age group".

Here, when the user 10 utters while the electronic apparatus 100 is displaying the general content 510, the electronic apparatus 100 may receive a voice of the user 10. In addition, the electronic apparatus 100 may identify age information corresponding to the user voice based on the received user voice. In addition, the electronic apparatus 100 may determine whether or not to run the kids mode based on the identified age information.

Figure 6:
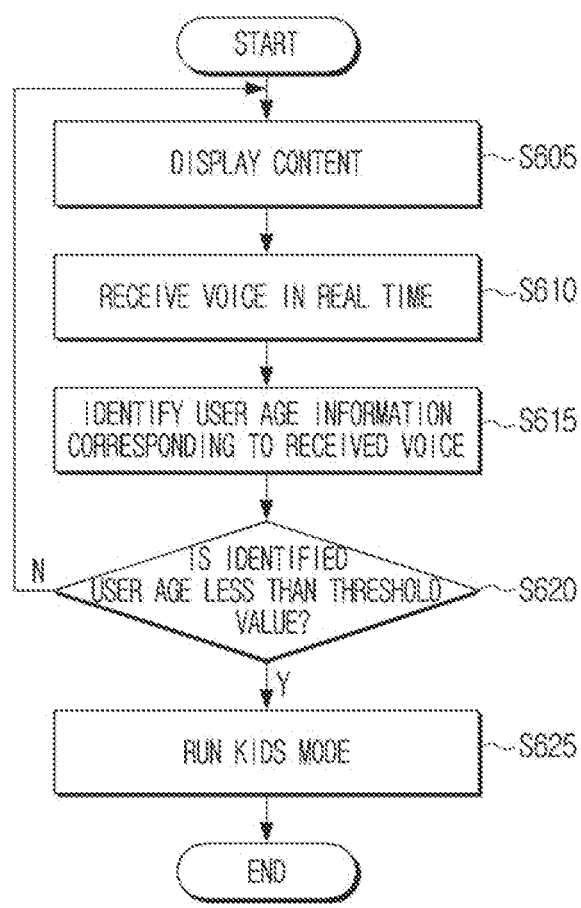
FIG. 6 is a flowchart for describing an operation of running a kids mode according to an embodiment.

FIG. 6 is a flowchart for describing an operation of running a kids mode according to an embodiment.

Referring to FIG. 6, the electronic apparatus 100 may display a content through the display 110 (S605). Then, the electronic apparatus 100 may receive a (user) voice in real time while displaying the content (S610). Here, the electronic apparatus 100 may run the voice recognition module to receive the (user) voice.

Then, the electronic apparatus 100 may identify user age information corresponding to the received (user) voice by analyzing the received (user) voice (S615). In addition, the electronic apparatus 100 may determine whether or not to run a kids mode based on the identified user age information.

Specifically, the electronic apparatus 100 may identify whether or not the user age information obtained in S615 is less than a threshold value (for example, 7) (S620). Here, when the obtained user age information is not less than the threshold value (when the obtained user age information is the threshold value or more), the electronic apparatus 100 may continuously display the content. That is, the electronic apparatus 100 may maintain a current mode (assumed to be a normal mode) of the electronic apparatus 100, and may repeatedly perform S605 to S620. Here, when the obtained user age information is less than the threshold value, the electronic apparatus 100 may run the kids mode (S625). Here, running the kids mode may mean changing the normal mode, which is the current mode of the electronic apparatus 100, to the kids mode.

In addition, an operation in S625 may also be applied while the general content is being displayed as in the embodiment of FIG. 5. For example, when the user voice of the user 10 is received while the general content is being currently displayed on the display 110, the electronic apparatus 100 may change the mode to the kids mode while continuously displaying the general content on the display 110. Therefore, in the abovementioned embodiment, a situation in which an adult content is displayed on the display 110 in the future may be prevented.

Figure 7:
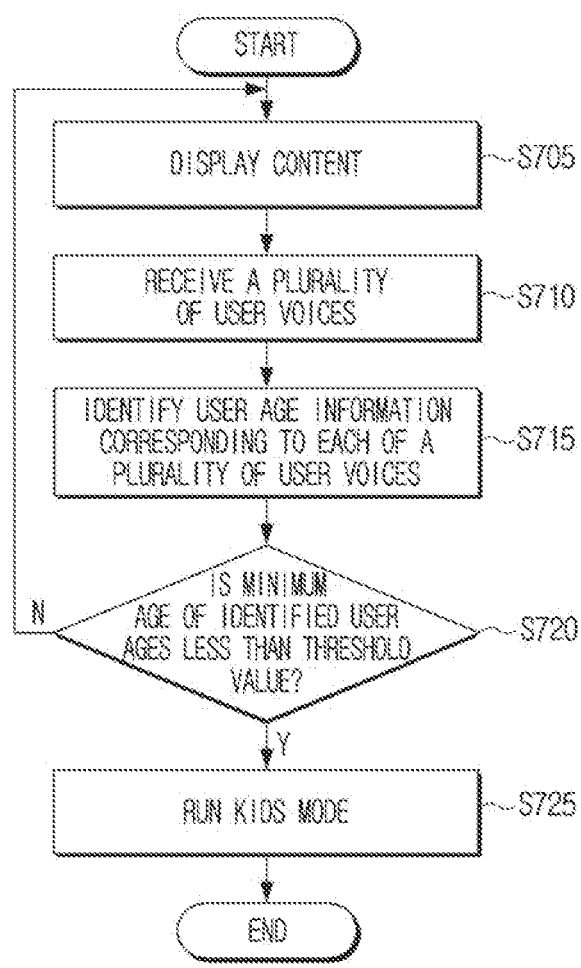
FIG. 7 is a flowchart for describing an operation of running a kids mode for a plurality of user voices.

FIG. 7 is a flowchart for describing an operation of running a kids mode for a plurality of user voices.

Referring to FIG. 7, the electronic apparatus 100 may display a content on the display 110 (S705). Then, the electronic apparatus 100 may receive a plurality of user voices while the content is being displayed on the display 110 (S710). The electronic apparatus 100 may determine whether or not voices of a plurality of users are included in the voice received for a predetermined time (for example, 1 minute). When the voices of the plurality of users are included in the received voice, the electronic apparatus 100 may analyze each of the plurality of user voices.

In addition, the electronic apparatus 100 may identify user age information corresponding to each of the plurality of user voices (S715). In addition, the electronic apparatus 100 may obtain minimum age information of the identified age information corresponding to each of the plurality of user voices.

Then, the electronic apparatus 100 may identify whether or not a minimum age of the identified ages corresponding to each of the plurality of user voices is less than a threshold value (for example, 7) (S720). When the minimum age is not less than the threshold value (when the minimum age is the threshold value or more), the electronic apparatus 100 may continuously display the content, and may repeat S705 to S720. When the minimum age is less than the threshold value, the electronic apparatus 100 may run the kids mode (S725).

The reason for identifying the minimum age in S720 is that there is a need to protect the youngest user. For example, it is assumed that four users are recognized by the voices received by the electronic apparatus 100 and the plurality of users are 5 years old, 12 years old, 15 years old, and 50 years old, respectively. The electronic apparatus 100 may determine the mode of the electronic apparatus 100 based on a 5-year-old user.

Figure 8:
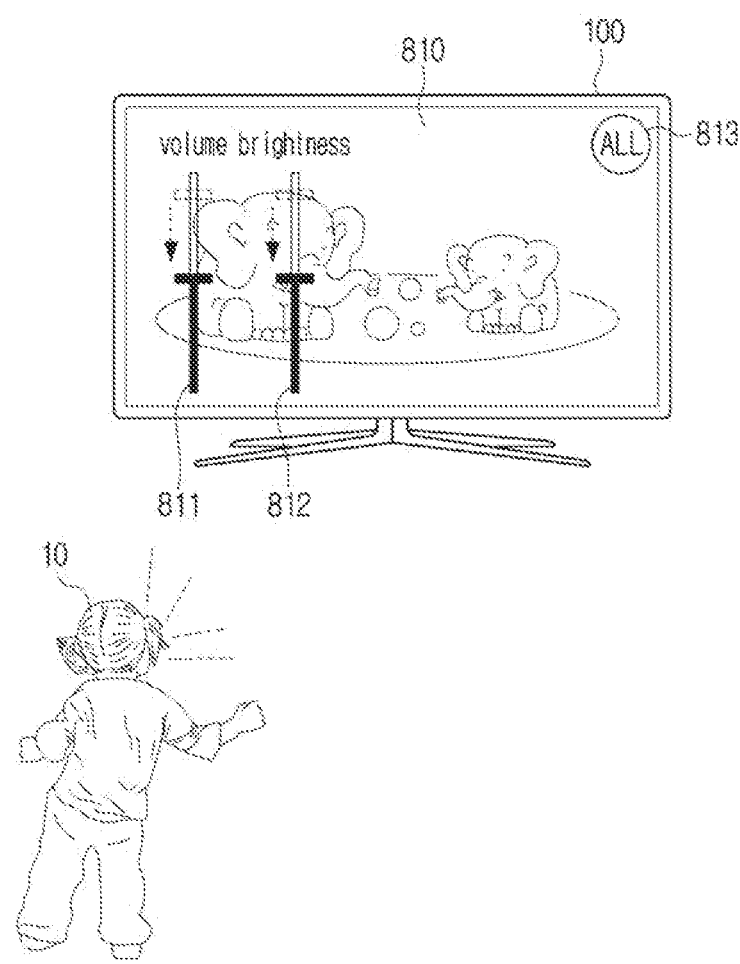
FIG. 8 is a view for describing an operation of an electronic apparatus according to another embodiment when a child voice is identified while a general content is being displayed.

FIG. 8 is a view for describing an operation of an electronic apparatus according to another embodiment when a child voice is identified while a general content is being displayed.

Referring to FIG. 8, the electronic apparatus 100 may display a content 810. Here, the content 810 may correspond to "available to all age groups", and the electronic apparatus 100 may display a UI 813 corresponding to "available to all age groups" together with the content 810.

Here, the electronic apparatus 100 may receive a voice of the user 10 in real time. In addition, the electronic apparatus 100 may obtain age information corresponding to the user voice.

According to an embodiment, when the user age is less than a threshold value, the electronic apparatus 100 may adjust a volume of the speaker 180 to a volume corresponding to the identified user age. For example, when the age of the user 10 is identified as 7, the electronic apparatus 100 may change a current volume of the speaker 180 to an appropriate volume corresponding to 7 years old. In addition, the electronic apparatus 100 may display the changed volume of the speaker 180 through a UI 811. Specifically, the electronic apparatus 100 may provide the change in volume based on the kids mode to the user as the UI 811. The user may easily recognize that the kids mode is operating properly through the UI 811.

According to another embodiment, when the user age is less than a threshold value, the electronic apparatus 100 may adjust a brightness of the display 110 to a brightness corresponding to the identified user age. For example, when the age of the user 10 is identified as 7, the electronic apparatus 100 may change a current brightness of the display 110 to an appropriate brightness corresponding to 7 years old. In addition, the electronic apparatus 100 may display the changed brightness of the display 110 through a UI 812. Specifically, the electronic apparatus 100 may provide the change in brightness based on the kids mode to the user as the UI 812. The user may easily recognize that the kids mode is operating properly through the UI 812.

According to still another embodiment, when the user age is less than a threshold value, the electronic apparatus 100 may adjust a volume of the speaker 180 to a volume corresponding to the identified user age, and adjust a brightness of the display 110 to a brightness corresponding to the identified user age. That is, the electronic apparatus 100 may adjust both of the volume of the speaker 180 and the brightness of the display 110 in the kids mode. In addition, the volume of the speaker 180 and the brightness of the display 110 may be different according to the age of the user 10. In addition, the volume of the speaker 180 and the brightness of the display 110 may be different according to pre-stored user information.

Figure 9:
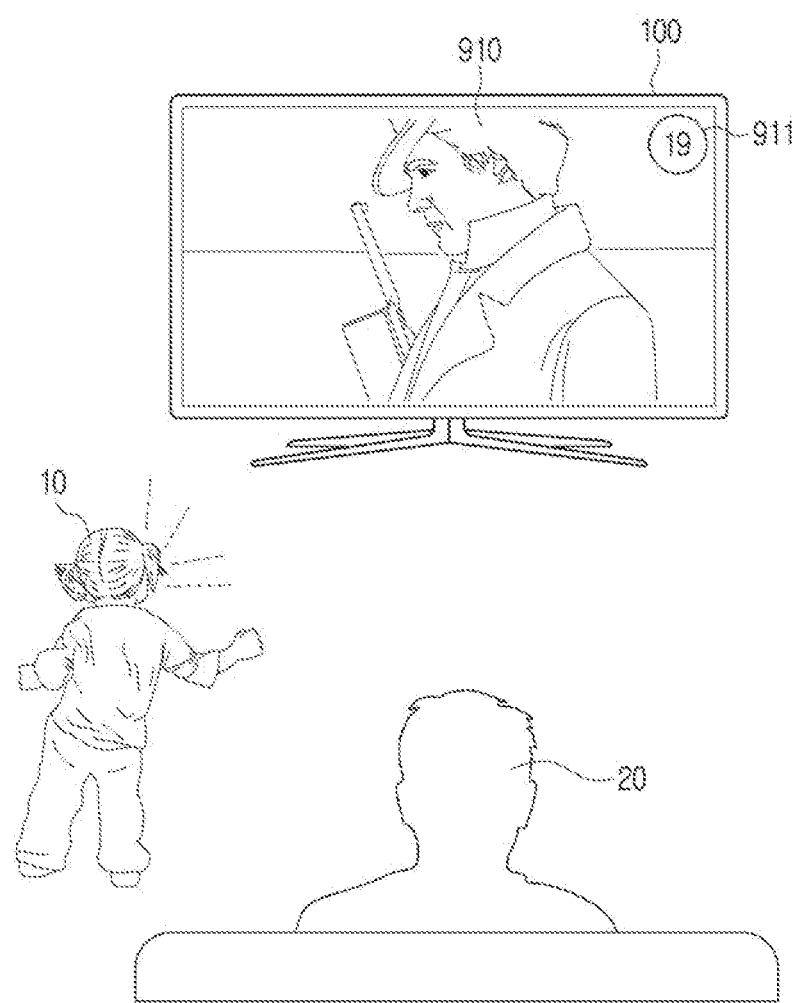
FIG. 9 is a view for describing an operation of an electronic apparatus according to an embodiment when a child voice is identified while an adult content is being displayed.

FIG. 9 is a view for describing an operation of an electronic apparatus according to an embodiment when a child voice is identified while an adult content is being displayed.

Referring to FIG. 9, the electronic apparatus 100 may display an adult content 910 for an adult user 20 on the display 110. In addition, the electronic apparatus 100 may display a UI 911 corresponding to the adult content 910. Here, the UI 911 corresponding to the adult content 910 may refer to a watching rating of a content. That is, the adult content 910 may mean that it is appropriate for people over the age of 19.

Here, the electronic apparatus 100 may receive a user voice in real time. The adult content 910 may be a content for the adult user 20. It is assumed that a voice of a child user 10 has been received while the adult content 910 is being displayed on the display 110. The electronic apparatus 100 may identify age information corresponding to the voice of the user 10. In addition, when the identified age corresponding to the user voice is less than a threshold value, the electronic apparatus 100 may run the kids mode.

Figure 10:
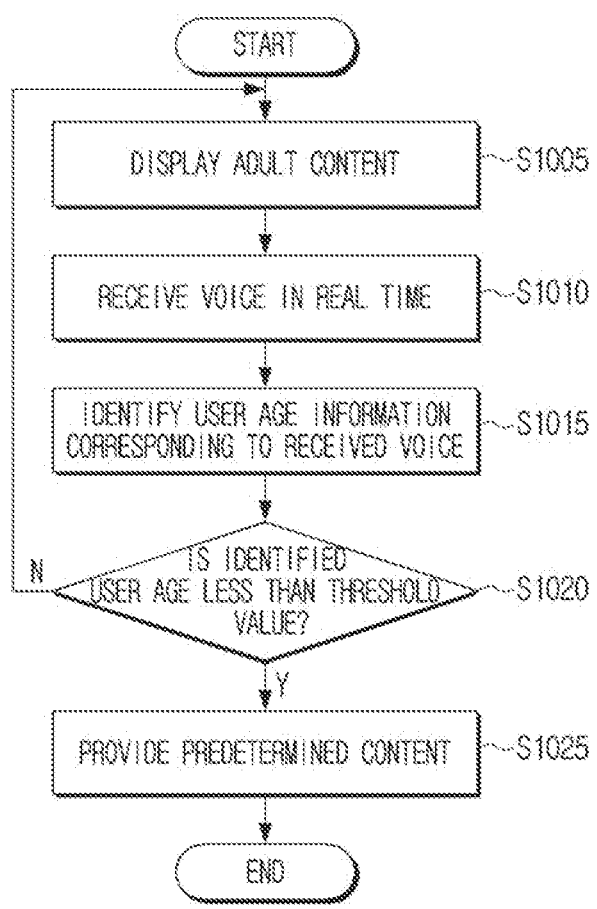
FIG. 10 is a flowchart for describing an operation of running a kids mode while an adult content is already being displayed.

FIG. 10 is a flowchart for describing an operation of running a kids mode while an adult content is already being displayed.

Referring to FIG. 10, the electronic apparatus 100 may display an adult content on the display 110 (S1005). Then, the electronic apparatus 100 may receive a voice in real time while displaying the adult content (S1010). Then, the electronic apparatus 100 may identify user age information corresponding to the received voice (S1015). Then, the electronic apparatus 100 may identify whether or not the identified user age is less than a threshold value (S1020).

In addition, when the identified user age is not less than the threshold value (when the identified user age is the threshold value or more), the electronic apparatus 100 may continuously display the adult content, and may repeat S1005 to S1020. Then, the electronic apparatus 100 may provide a predetermined content (S1025) when the identified user age is less than the threshold value. Specifically, the electronic apparatus 100 may display the predetermined content on the display 110.

Figure 11:
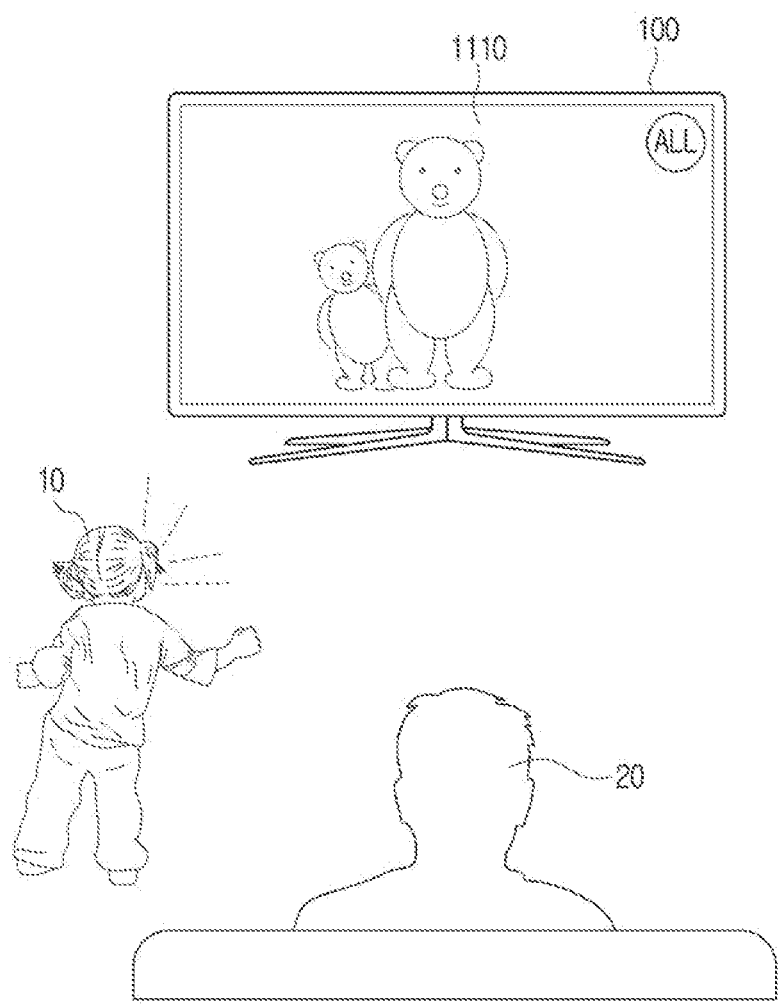
FIG. 11 is a view for describing a content according to an embodiment displayed in the kids mode.

FIG. 11 is a view for describing a content according to an embodiment displayed in the kids mode.

Referring to FIG. 11, when a voice of a child user 10 is received while an adult content is being displayed, the electronic apparatus 100 may display a predetermined content. Here, the predetermined content may refer to a kids channel content or a kids VOD content. When the electronic apparatus 100 runs the kids mode while the adult content 910 of FIG. 9 is being displayed, the electronic apparatus 100 may immediately display a predetermined content 1110 on the display 110. Here, the predetermined content 1110 may be a content corresponding to an age of the child user 10.

Because the adult content 910 is automatically changed to the predetermined content 1110, an adult user 20 may use the kids mode without performing a separate manipulation.

Figure 12:
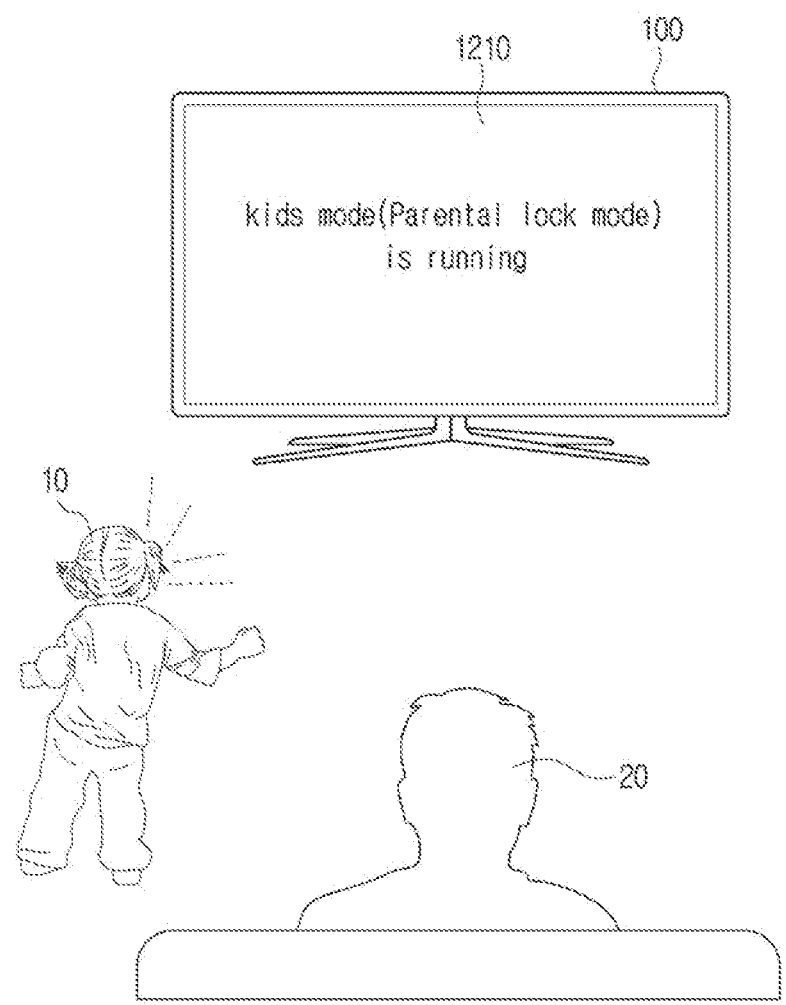
FIG. 12 is a view for describing a content according to another embodiment displayed in the kids mode.

FIG. 12 is a view for describing a content according to another embodiment displayed in the kids mode.

Referring to FIG. 12, when a voice of a child user 10 is received while an adult content is being displayed, the electronic apparatus 100 may display a screen 1210 corresponding to a predetermined content. Here, the predetermined content may be a content displaying information indicating that the kids mode is being performed. In addition, the predetermined content may be a guide screen. For example, the electronic apparatus 100 may display a content including text information indicating that the kids mode is currently running, on the display 110. When the electronic apparatus 100 runs the kids mode while the adult content 910 of FIG. 9 is being displayed, the electronic apparatus 100 may immediately display the screen 1210 corresponding to the predetermined content on the display 110.

Because the adult content 910 is automatically changed to the screen 1210 corresponding to the predetermined content, an adult user 20 may use the kids mode without performing a separate manipulation.

Figure 13:
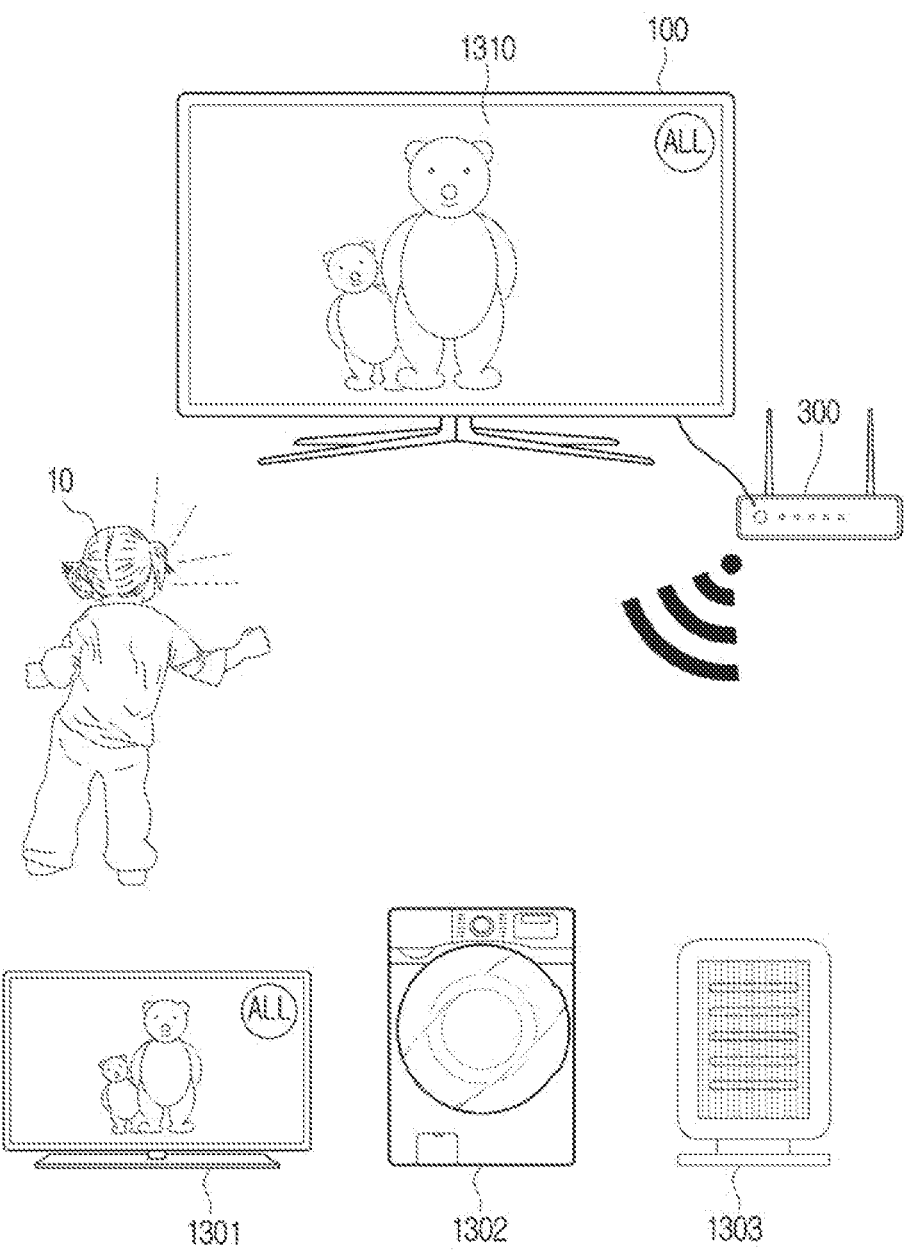
FIG. 13 is a view for describing an embodiment of running a kids mode in a plurality of home appliances connected to an electronic apparatus.

FIG. 13 is a view for describing an embodiment of running a kids mode in a plurality of home appliances connected to an electronic apparatus.

Referring to FIG. 13, when a voice of a child user 10 is received while an adult content is being displayed, the electronic apparatus 100 may display a predetermined content 1310. Here, the electronic apparatus 100 may be connected to an access point (AP) apparatus 300. In addition, the electronic apparatus 100 may be included in the IoT network including a plurality of home appliances 1301, 1302, and 1303.

When the kids mode is run in the electronic apparatus 100, the electronic apparatus 100 may control not only the electronic apparatus 100 but also all of the plurality of home appliances included in the same IoT network to run the kids mode. Specifically, the electronic apparatus 100 may generate a control command so that the plurality of home appliances may operate in the kids mode, and transmit the generated control command to the plurality of home appliances through the AP apparatus 300.

The home appliance 1301 of the plurality of home appliances may include a display apparatus, and a display apparatus may run the kids mode like the electronic apparatus 100. Specifically, the display apparatus may display a predetermined content.

The home appliance 1302 of the plurality of home appliances may be a washing machine, and the washing machine may run a kids mode corresponding to the washing machine. Specifically, the washing machine may not perform a new operation (for example, washing, dewatering, drying, or the like) of the washing machine in the kids mode. This is to prevent a situation in which a child is inside the washing machine. Here, when the washing machine is already operating, the washing machine may not stop an operation in the middle even though a child voice is identified.

The home appliance 1303 of the plurality of home appliances may be an electric heater, and the electric heater may run a kids mode corresponding to the electric heater. Specifically, the electric heater may change a current temperature to a threshold value or less in the kids mode. This is to prevent a risk of a burn when a child is near the electric heater.

Each of the plurality of home appliances is implemented to run the kids mode by receiving a child's voice, but may not include a microphone depending on a type thereof. Therefore, when the kids mode is run in the electronic apparatus 100, which is one of the plurality of home appliances included in the IoT network, the electronic apparatus 100 may transmit a control command for running the kids mode to all of the plurality of home appliances to each home appliance.

Figure 14:
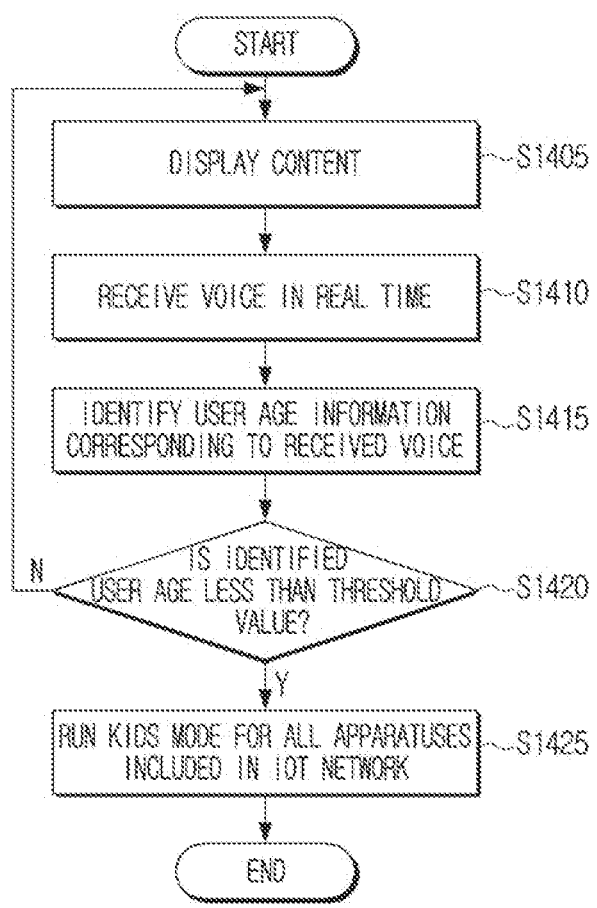
FIG. 14 is a flowchart for describing an embodiment of running a kids mode in a plurality of home appliances connected to an electronic apparatus.

FIG. 14 is a flowchart for describing an embodiment of running a kids mode in a plurality of home appliances connected to an electronic apparatus.

Referring to FIG. 14, S1405, S1410, S1415, and S1420 may correspond to S605, S610, S615, and S620 of FIG. 6. Therefore, a detailed description will be omitted.

When the user age identified in S1420 is not less than the threshold value (when the user age is the threshold value or more), the electronic apparatus 100 may continuously display the content, and may repeat S1405 to S1420. When the user age identified in S1420 is less than the threshold value, the electronic apparatus 100 may identify the IoT network including the electronic apparatus 100 and perform control to run the kids mode for all home appliances included in the identified IoT network (S1425). Specifically, the electronic apparatus 100 may generate a control command for running the kids mode for each of the plurality of home appliances, and transmit the generated control command to each of the plurality of home appliances.

Figure 15:
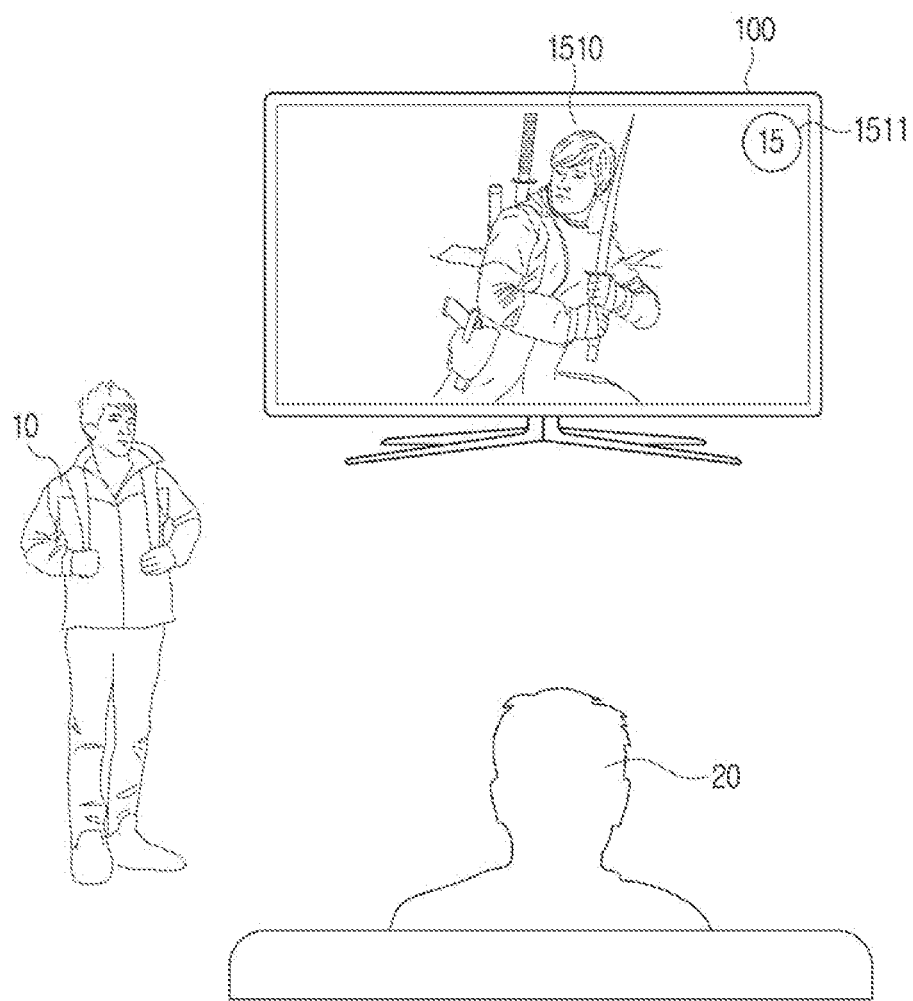
FIG. 15 is a diagram for describing an embodiment of identifying a watching rating of a content.

FIG. 15 is a diagram for describing an embodiment of identifying a watching rating of a content.

Referring to FIG. 15, the electronic apparatus 100 may display a content 1510 on the display 110, and may also display a UI 1511 indicating a watching rating of the content 1510. Here, it is assumed that the content 1510 represents a 15-year-old watching rating.

The electronic apparatus 100 may receive a voice of the user 10 to identify an age of the user 10. In addition, the electronic apparatus 100 may compare the age of the user and the watching rating of the content 1510 with each other. In addition, the electronic apparatus 100 may determine whether or not to run the kids mode based on a comparison result.

Figure 16:
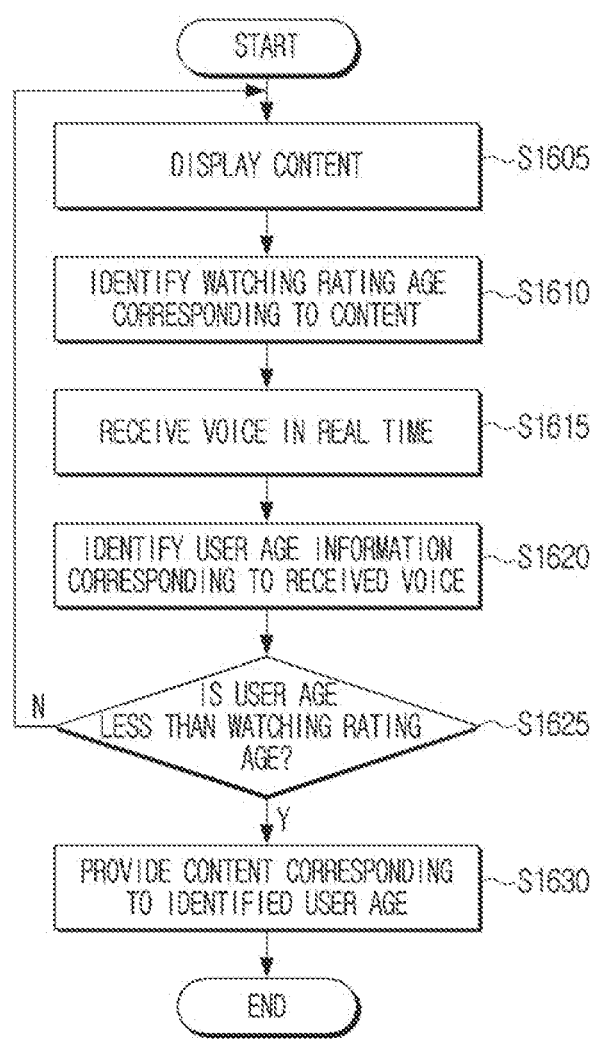
FIG. 16 is a flowchart for describing an embodiment of identifying a watching rating of a content.

FIG. 16 is a flowchart for describing an embodiment of identifying a watching rating of a content.

Referring to FIG. 16, the electronic apparatus 100 may display a content on the display 110 (S1605). Then, the electronic apparatus 100 may identify a watching rating age corresponding to the displayed content (S1610). Specifically, the electronic apparatus 100 may obtain a watching rating corresponding to the content and identify an age corresponding to the obtained watching rating. For convenience, the identified age is described as the watching rating age corresponding to the content. For example, the watching rating age corresponding to the content 1510 described with reference to FIG. 15 may be 15.

Then, the electronic apparatus 100 may receive a voice in real time (S1615). Then, the electronic apparatus 100 may identify user age information corresponding to the received voice (S1620).

Then, the electronic apparatus 100 may identify whether or not the identified user age is less than the watching rating age (S1625). When the identified user age is not less than the watching rating age, the electronic apparatus 100 may continuously display the content, and may repeat S1605 to S1625. Here, when the identified user age is less than the watching rating age, the electronic apparatus 100 may provide a content corresponding to the identified user age (S1630). For example, it is assumed that a content of which a watching rating age is 15 is currently being displayed on the display 110. When the user age is less than 15, the electronic apparatus 100 may display a content corresponding to an age less than 15 on the display 110 by running the kids mode. When the user age is not less than 15, the electronic apparatus 100 may continuously display the content currently displayed on the display 110.

Figure 17:
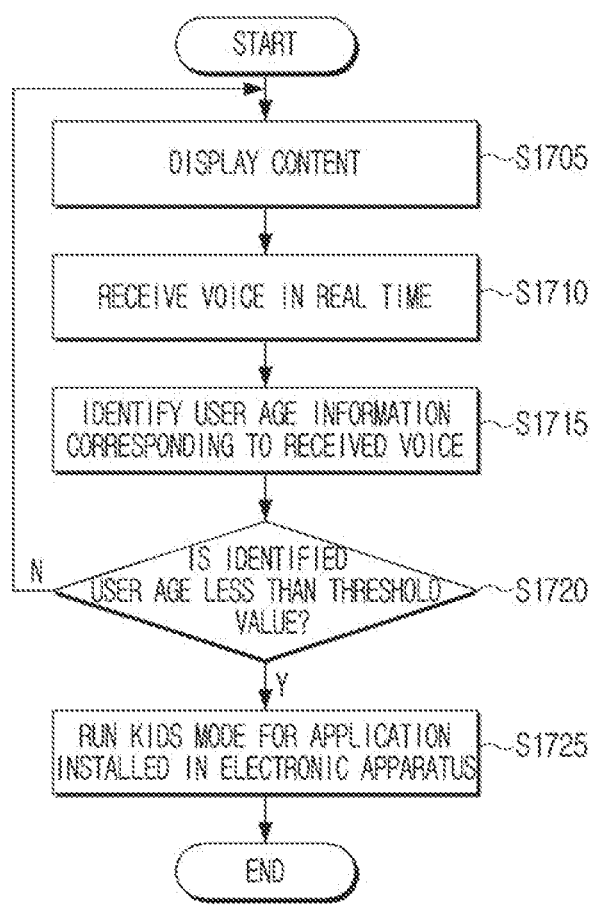
FIG. 17 is a flowchart for describing an embodiment of running a kids mode in an application installed in an electronic apparatus.

FIG. 17 is a flowchart for describing an embodiment of running a kids mode in an application installed in an electronic apparatus.

Referring to FIG. 17, S1705, S1710, S1715, and S1720 may correspond to S605, S610, S615, and S620 of FIG. 6. Therefore, a detailed description will be omitted.

When the user age identified in S1720 is not less than the threshold value (when the user age is the threshold value or more), the electronic apparatus 100 may continuously display the content, and may repeat S1705 to S1720. When the user age identified in S1720 is less than the threshold value, the electronic apparatus 100 may run the kids mode for at least one application installed in the electronic apparatus 100 (S1725).

The electronic apparatus 100 may include a plurality of applications. For example, the electronic apparatus 100 may include a TV application, a video platform application, a game application, and the like. Here, at least one of the respective applications may include a kids mode. The respective applications may store the kids mode for protecting a child.

Here, when the user age identified in S1720 is less than the threshold value, the electronic apparatus 100 may change a mode of each of the plurality of applications installed in the electronic apparatus 100 to the kids mode. Here, only one of the plurality of applications may be in an activated state and the others of the plurality of applications may be in a deactivated state. In this case, the electronic apparatus 100 may preferentially change a mode of the activated application to the kids mode, and then change a mode of the deactivated application to the kids mode.

Figure 18:
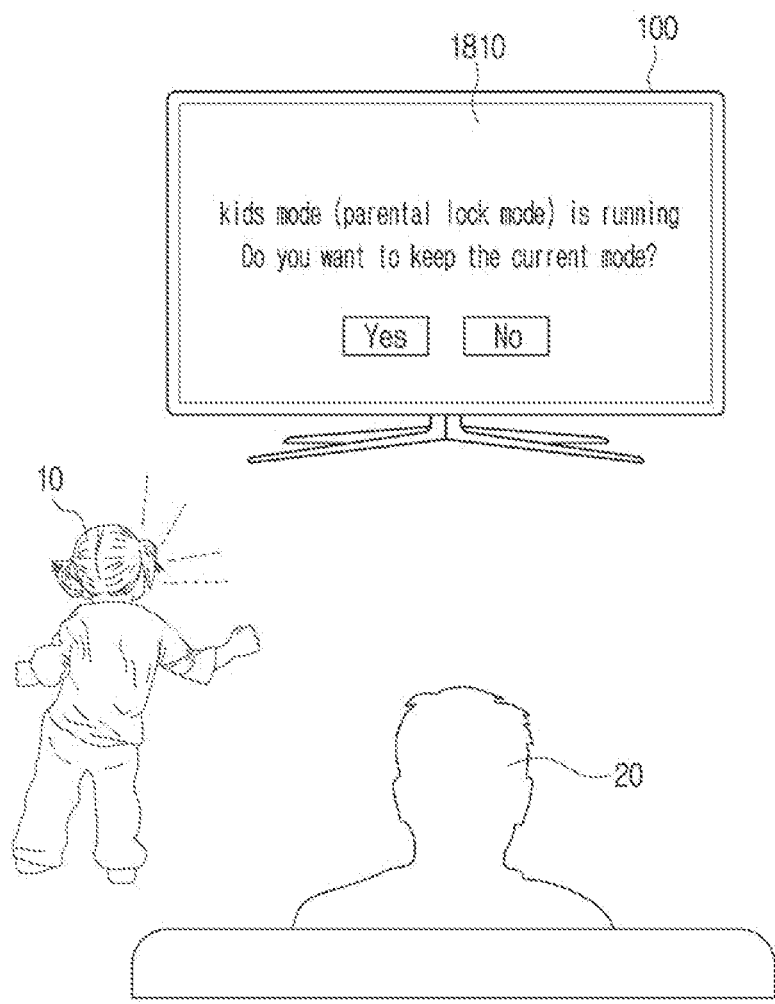
FIG. 18 is a view for describing an embodiment of canceling a kids mode.

FIG. 18 is a view for describing an embodiment of canceling a kids mode.

Referring to FIG. 18, the electronic apparatus 100 may display a guide screen 1810 for canceling the kids mode. Here, the guide screen may be described as a guide UI or a guide content.

The electronic apparatus 100 may display a guide screen asking a user whether or not to cancel the kids mode on the display 110. Here, the electronic apparatus 100 does not permit a selection by a button or a remote control apparatus to cancel the kids mode, and may perform control to cancel the kids mode only through a voice command. This is to prevent a child user 10 from canceling the kids mode through the button or the remote control apparatus. In the embodiment of FIG. 18, a voice of an adult user 20 may be required to cancel the kids mode.

Figure 19:
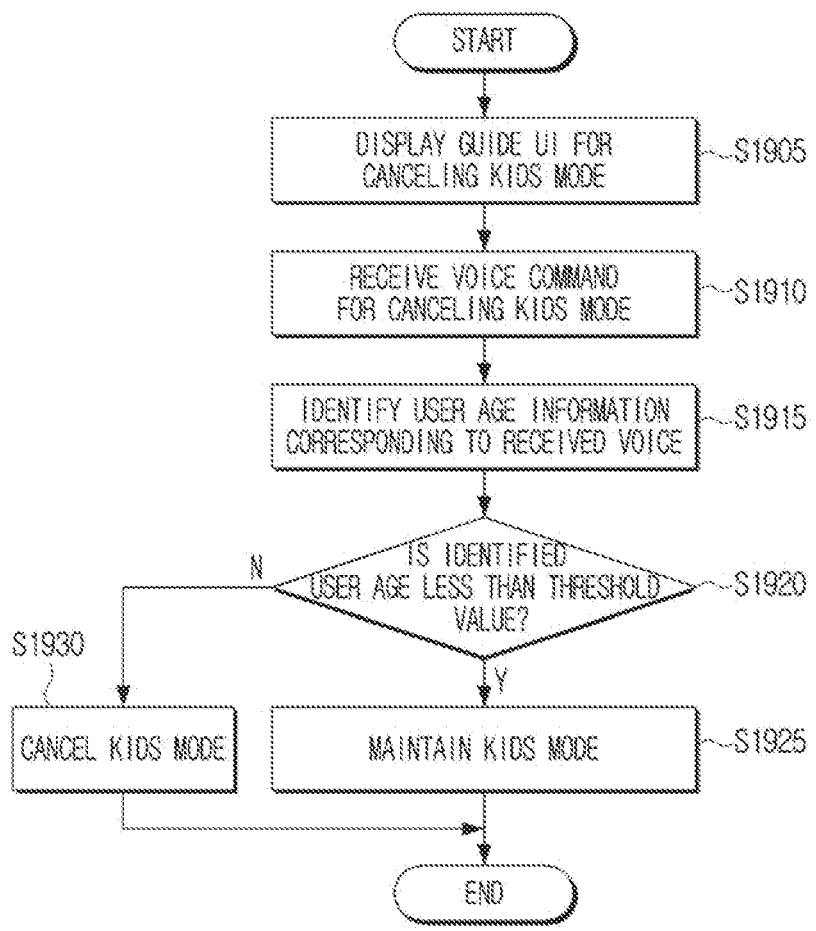
FIG. 19 is a flowchart for describing an embodiment of canceling a kids mode.

FIG. 19 is a flowchart for describing an embodiment of canceling a kids mode.

Referring to FIG. 19, the electronic apparatus 100 may display a guide UI for canceling the kids mode on the display 110 (S1905). For example, the guide UI may include information indicating that a voice command of an adult user is required to cancel the kids mode. The electronic apparatus 100 may receive the voice command for canceling the kids mode (S1910). Then, the electronic apparatus 100 may identify user age information corresponding to the received voice (S1915). Then, the electronic apparatus 100 may identify whether or not the identified user age is less than a threshold value (S1920).

Here, when the identified user age is less than the threshold value, the electronic apparatus 100 may maintain the kids mode (S1925). When the identified user age is not less than the threshold value (when the identified user age is the threshold value or more), the electronic apparatus 100 may cancel the kids mode (S1930).

Figure 20:
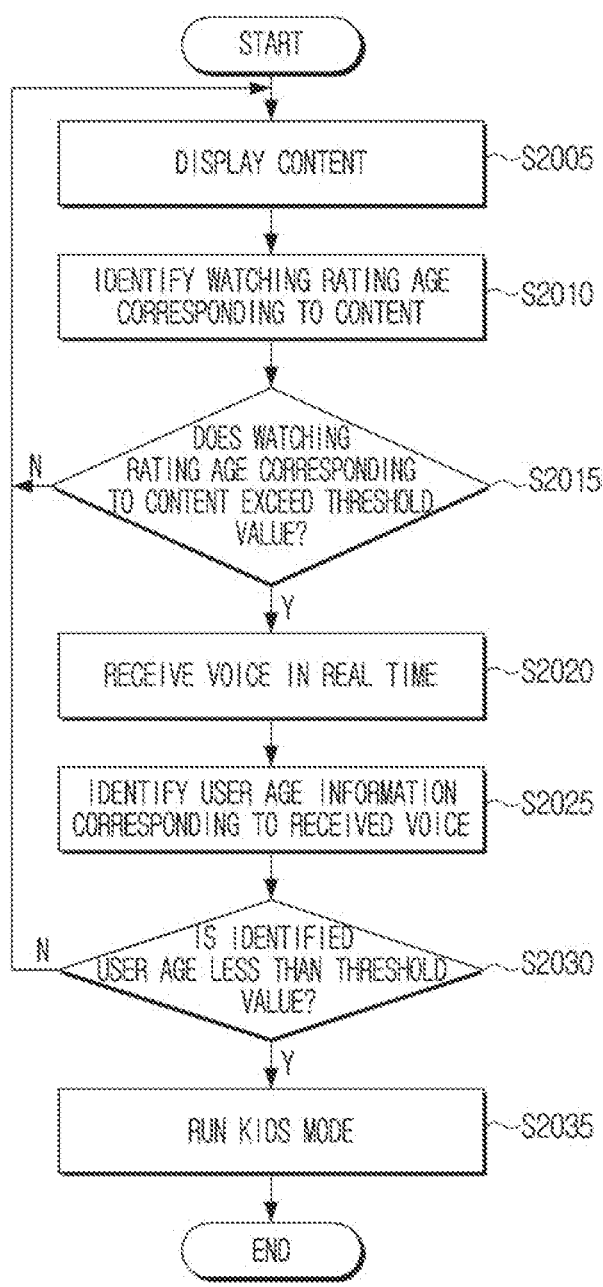
FIG. 20 is a flowchart for describing an embodiment of receiving a user voice based on a watching rating age corresponding to a content.

FIG. 20 is a flowchart for describing an embodiment of receiving a user voice based on a watching rating age corresponding to a content.

Referring to FIG. 20, the electronic apparatus 100 may display a content on the display 110 (S2005). Then, the electronic apparatus 100 may identify a watching rating age corresponding to the content (S2010). Then, the electronic apparatus 100 may identify whether or not the watching rating age corresponding to the content exceeds a threshold value (for example, 7) (S2015).

In addition, when the watching rating age does not exceed the threshold value, the electronic apparatus 100 may continuously display the content. When the content is changed, the electronic apparatus 100 may repeatedly perform operations of S2010 and S2015.

Then, when the watching rating age exceeds the threshold value, the electronic apparatus 100 may receive a voice in real time (S2020). Specifically, the electronic apparatus 100 may identify the watching rating age in real time and may not run the voice recognition module when the watching rating age is not greater than the threshold value. The meaning that the electronic apparatus does not run the voice recognition module may be that the electronic apparatus may not receive the user voice through the microphone. Meanwhile, according to an embodiment, the voice recognition module may be included in the electronic apparatus 100. According to another embodiment, the voice recognition module may be included in the remote control apparatus corresponding to the electronic apparatus 100. According to still another embodiment, the voice recognition module may be included in the external apparatus communicating with the electronic apparatus 100.

When the watching rating age exceeds the threshold value, the electronic apparatus 100 may change the voice recognition module from a turn-off state to a turn-on state. When the voice recognition module is changed to the turn-on state, the voice recognition module may receive the user voice.

The electronic apparatus 100 may identify user age information corresponding to the received (user) voice (S2025). Then, the electronic apparatus 100 may identify whether or not the identified user age is less than a threshold value (S2030). Here, when the user age information is not less than the threshold value (when the user age information is the threshold value or more), the electronic apparatus 100 may continuously display the content. In addition, the electronic apparatus 100 may repeat S2005 to S2030.

When the user age is less than the threshold value, the electronic apparatus 100 may run the kids mode (S2035).

The application does not always run the voice recognition module, and may run the voice recognition module only for a content from which a child needs to be protected. Therefore, power may be saved.

For example, when the electronic apparatus 100 displays a content corresponding to "available to all age groups" on the display 110, there is no need to run the kids mode. Therefore, the electronic apparatus 100 may not run the voice recognition module to receive a kids mode command.

However, when the electronic apparatus 100 is displaying a content corresponding to "available to a 7 years old", it may be a need to run the kids mode. Therefore, the electronic apparatus 100 may run the voice recognition module to receive a kids mode command.

Here, the electronic apparatus 100 may store user age information in the memory 130 in advance. For example, it is assumed that family members are 12, 15, 45, and 50 years old. The electronic apparatus 100 may store ages of four family members.

Here, the age of the threshold value applied in S2015 may be determined in consideration of a minimum age of the ages of the family members stored in the memory 130. For example, in the abovementioned embodiment, the minimum age is 12. Therefore, when a watching rating of the content exceeds 12 years old, the electronic apparatus 100 may perform the voice recognition module.

Meanwhile, when a user voice that is not stored in the memory 130 is added, the electronic apparatus 100 may temporarily identify user age information corresponding to the user voice and reflect the identified user age information in the threshold value of S2015. Here, the user voice that is not stored in the memory 130 may be temporary, and may thus be considered only for a predetermined time without being stored as a list.

Figure 21:
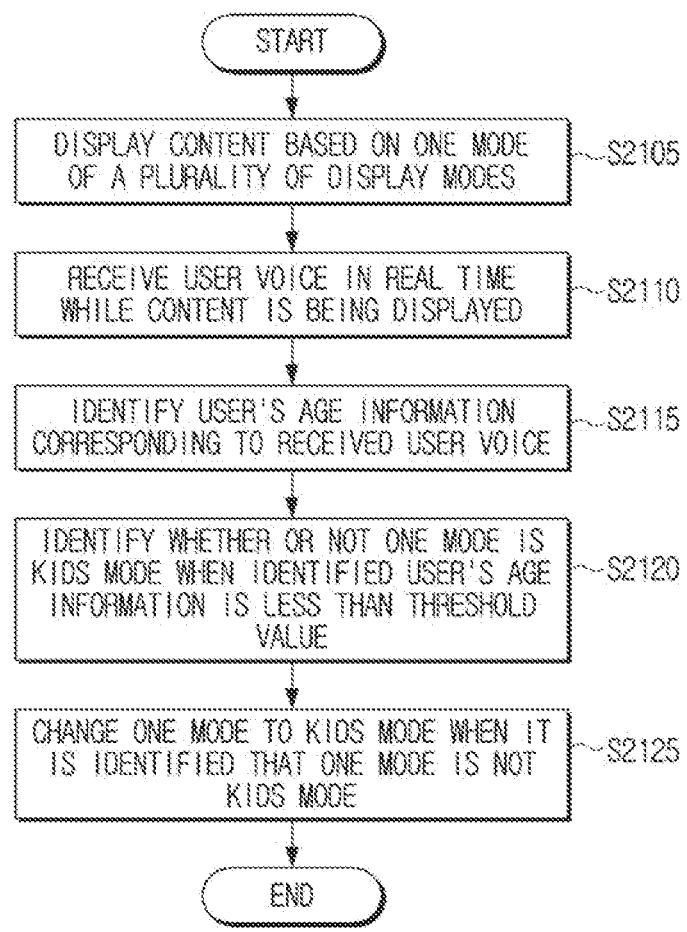
FIG. 21 is a flowchart for describing a controlling method of an electronic apparatus according to an embodiment of the disclosure.

FIG. 21 is a flowchart for describing a controlling method of an electronic apparatus according to an embodiment of the disclosure.

Referring to FIG. 21, the controlling method of an electronic apparatus 100 includes displaying a content based on one mode of a plurality of display modes (S2105), receiving a user voice in real time while the content is being displayed (S2110), identifying user's age information corresponding to the received user voice (S2115), identifying whether or not the one mode is a kids mode (S2120) when the identified user's age information is less than a threshold value, and changing the one mode to the kids mode (S2125) when it is identified that the one mode is not the kids mode.

Meanwhile, the kids mode is a mode of selectively providing only a content corresponding to the identified user's age information, and the controlling method of an electronic apparatus may further include providing at least one of a kids channel content or a kids VOD content corresponding to the identified user's age information when the identified user's age information is less than the threshold value.

Meanwhile, the controlling method of an electronic apparatus may further include displaying a guide screen guiding entry into the kids mode.

Meanwhile, the controlling method of an electronic apparatus may further include transmitting a control command for running the kids mode to a plurality of apparatuses connected to the IoT network including the electronic apparatus 100 when the identified user's age information is less than the threshold value.

Meanwhile, in the changing (S2125) of the one mode to the kids mode, the watching rating age corresponding to the content displayed on the display of the electronic apparatus 100 may be identified, and the content corresponding to the identified user age may be displayed when the identified user age is less than the identified watching rating age.

Meanwhile, the controlling method of an electronic apparatus may further include performing control to run the kids mode through at least one application installed in the electronic apparatus 100 when the identified user's age information is less than the threshold value.

Meanwhile, the changing (S2125) of the one mode to the kids mode may include running the kids mode to display a content corresponding to identified first user's age information when the identified first user's age information is less than the threshold value; identifying second user's age information corresponding to a second user voice for canceling the run kids mode when the second user voice is received; canceling the run kids mode when the second user's age information is the threshold value or more; and maintaining the run kids mode when the second user's age information is less than the threshold value.

Meanwhile, the controlling method of an electronic apparatus may further include adjusting a volume of the electronic apparatus 100 to a volume corresponding to the identified user's age information or adjusting a brightness of the display of the electronic apparatus 100 to a brightness corresponding to the identified user's age information, when the identified user's age information is less than the threshold value.

Meanwhile, the received user voice may include a plurality of user voices, and the controlling method of an electronic apparatus may further include identifying user's age information corresponding to each of the plurality of user voices; and running the kids mode when a minimum age of the identified age information corresponding to each of the plurality of user voices is less than the threshold value.

Meanwhile, the controlling method of an electronic apparatus may further include identifying a watching rating age corresponding to the content displayed on the display of the electronic apparatus 100; and running the voice recognition module to receive the user voice when the identified watching rating age is the threshold value or more.

Meanwhile, the controlling method of an electronic apparatus as illustrated in FIG. 21 may be executed on the electronic apparatus having the components of FIG. 3 or 4 or may be executed on an electronic apparatus having other components.

Meanwhile, the methods according to the diverse embodiments of the disclosure described above may be implemented in the form of an application that may be installed in an existing electronic apparatus.

In addition, the methods according to the diverse embodiments of the disclosure described above may be implemented only by software upgrade or hardware upgrade for the existing electronic apparatus.

Further, the diverse embodiments of the disclosure described above may also be performed through an embedded server included in the electronic apparatus or an external server of at least one of the electronic apparatus or the display apparatus.

Meanwhile, according to an embodiment of the disclosure, the diverse embodiments described above may be implemented as software including instructions stored in a machine-readable storage medium (for example, a computer-readable storage medium). A machine may be an apparatus that invokes the stored instruction from the storage medium and may operate according to the invoked instruction, and may include the electronic apparatus according to the disclosed embodiments. When a command is executed by the processor, the processor may directly perform a function corresponding to the command or other components may perform the function corresponding to the command under a control of the processor. The command may include codes created or executed by a compiler or an interpreter. The machine-readable storage medium may be provided in the form of a non-transitory storage medium. Here, the term 'non-transitory' means that the storage medium is tangible without including a signal, and does not distinguish whether data are semi-permanently or temporarily stored in the storage medium.

In addition, according to an embodiment of the disclosure, the methods according to the diverse embodiments described above may be included and provided in a computer program product. The computer program product may be traded as a product between a seller and a purchaser. The computer program product may be distributed in the form of a storage medium (for example, a compact disc read only memory (CD-ROM)) that may be read by the machine or online through an application store (for example, PlayStore™). In a case of the online distribution, at least portions of the computer program product may be at least temporarily stored in a storage medium such as a memory of a server of a manufacturer, a server of an application store, or a relay server or be temporarily created.

In addition, each of components (for example, modules or programs) according to the diverse embodiments described above may include a single entity or a plurality of entities, and some of the corresponding sub-components described above may be omitted or other sub-components may be further included in the diverse embodiments. Alternatively or additionally, some of the components (for example, the modules or the programs) may be integrated into one entity, and may perform functions performed by the respective corresponding components before being integrated in the same or similar manner. Operations performed by the modules, the programs, or other components according to the diverse embodiments may be executed in a sequential manner, a parallel manner, an iterative manner, or a heuristic manner, at least some of the operations may be performed in a different order or be omitted, or other operations may be added.

Although embodiments of the disclosure have been illustrated and described hereinabove, the disclosure is not limited to the abovementioned specific embodiments, but may be variously modified by those skilled in the art to which the disclosure pertains without departing from the gist of the disclosure as disclosed in the accompanying claims. These modifications should also be understood to fall within the scope and spirit of the disclosure.

The invention claimed is:

1. An electronic apparatus comprising:
a display; and
a processor configured to:
control the display to display a content based on one mode among a plurality of display modes,
receive a plurality of user voice inputs in real time while the content is being displayed,
identify user's age information corresponding to each of the plurality of user voice inputs,
identify whether the one mode is a kids mode, among the plurality of display modes, based on a minimum age of the identified user's age information corresponding to each of the plurality of user voice inputs being less than a threshold value,
based on the one mode being identified as not being the kids mode, change the one mode to the kids mode and control the display to operate in the kids mode whereby content obtained based on the identified user's age information is displayed, and
based on the one mode being the kids mode, control the display to operate in the one mode whereby the display of the content based on the one mode is maintained,
wherein the processor is configured to:
adjust a volume of the electronic apparatus to a volume corresponding to the identified user's age information and adjust a brightness of the display to a brightness corresponding to the identified user's age information, when the minimum age is less than the threshold value.

2. The electronic apparatus as claimed in claim 1, wherein the kids mode is a mode of selectively providing only a content corresponding to the identified user's age information, and
the processor is configured to provide at least one of a kids channel content or a kids video on demand (VOD) content corresponding to the identified user's age information based on the identified user's age information being less than the threshold value.

3. The electronic apparatus as claimed in claim 1, wherein the processor is configured to display a guide screen to guide entry into the kids mode.

4. The electronic apparatus as claimed in claim 1, wherein the processor is configured to transmit a control command to run the kids mode to a plurality of apparatuses connected to an Internet of Things (IoT) network including the electronic apparatus based on the identified user's age information being less than the threshold value.

5. The electronic apparatus as claimed in claim 1, wherein the processor is configured to:
identify a watching rating age corresponding to the content displayed on the display, and
control the display to display a content corresponding to the identified user age based on the identified user age being less than the identified watching rating age.

6. The electronic apparatus as claimed in claim 1, wherein the processor is configured to perform control to run the kids mode through at least one application installed in the electronic apparatus based on the identified user's age information being less than the threshold value.

7. The electronic apparatus as claimed in claim 1, wherein a user corresponding to the minimum age is a first user, and
wherein the processor is configured to:
run the kids mode to display a content corresponding to identified first user's age information based on the identified first user's age information being less than the threshold value,
identify second user's age information corresponding to a second user voice input which is of a second user to cancel the run kids mode based on the second user voice input being received,
cancel the run kids mode when the second user's age information is equal to or greater than the threshold value, and
maintain the run kids mode based on the second user's age information being less than the threshold value.

8. The electronic apparatus as claimed in claim 1, further comprising a memory configured to store a voice recognition module,
the processor is configured to
identify a watching rating age corresponding to the content displayed on the display, and
run the voice recognition module to receive the plurality of user voice inputs based on the identified watching rating age being equal to or greater than the threshold value.

9. A controlling method of an electronic apparatus, comprising:
displaying a content based on one mode of a plurality of display modes;
receiving a plurality of user voice inputs in real time while the content is being displayed;
identifying user's age information corresponding to each of the plurality of user voice inputs;
identifying whether the one mode is a kids mode, among the plurality of display modes, based on a minimum age of the identified user's age information corresponding to each of the plurality of user voice inputs being less than a threshold value;
based on the one mode being identified as not being the kids mode, changing the one mode and controlling the display to operate in the kids mode whereby content obtained based on the identified user's age information is displayed; and
based on the one mode being the kids mode, controlling the display to operate in the one mode whereby the display of the content based on the one mode is maintained,
wherein the controlling method further comprising:
adjusting a volume of the electronic apparatus to a volume corresponding to the identified user's age information and adjusting a brightness of the display to a brightness corresponding to the identified user's age information, when the minimum age is less than the threshold value.

10. The controlling method of an electronic apparatus as claimed in claim 9, wherein the kids mode is a mode of selectively providing only a content corresponding to the identified user's age information, and
the controlling method of an electronic apparatus further comprises providing at least one of a kids channel content or a kids VOD content corresponding to the identified user's age information based on the identified user's age information being less than the threshold value.

11. The controlling method of an electronic apparatus as claimed in claim 9, further comprising displaying a guide screen to guide entry into the kids mode.

12. The controlling method of an electronic apparatus as claimed in claim 9, further comprising:
- transmitting a control command to run the kids mode to a plurality of apparatuses connected to an IoT network including the electronic apparatus based on the identified user's age information being less than the threshold value.

13. The controlling method of an electronic apparatus as claimed in claim 9, wherein the changing of the one mode to the kids mode comprises:
- identifying a watching rating age corresponding to the content displayed on the display of the electronic apparatus, and
- displaying a content corresponding to the identified user age based on the identified user age being less than the identified watching rating age.

\* \* \* \* \*